(12) United States Patent
Chelst

(10) Patent No.: US 9,533,227 B2
(45) Date of Patent: Jan. 3, 2017

(54) SYSTEMS AND METHODS IN SUPPORT OF PROVIDING CUSTOMIZED GAMIFICATION FOR ACCOMPLISHING GOALS

(71) Applicant: Mingo Development, Inc., Woodmere, NY (US)

(72) Inventor: Azriel Chelst, Woodmere, NY (US)

(73) Assignee: Mingo Development, Inc., New York, NY (US)

(*) Notice: Subject to any disclaimer, the term of this patent is extended or adjusted under 35 U.S.C. 154(b) by 87 days.

(21) Appl. No.: 14/216,466

(22) Filed: Mar. 17, 2014

(65) Prior Publication Data

US 2014/0274413 A1    Sep. 18, 2014

Related U.S. Application Data

(60) Provisional application No. 61/792,808, filed on Mar. 15, 2013.

(51) Int. Cl.
*A63F 9/24* (2006.01)
*A63F 13/795* (2014.01)
*A63F 13/847* (2014.01)

(52) U.S. Cl.
CPC ........... *A63F 13/795* (2014.09); *A63F 13/847* (2014.09)

(58) Field of Classification Search
CPC ..... G07F 17/3227; A63F 13/12; A63F 13/795
See application file for complete search history.

(56) References Cited

U.S. PATENT DOCUMENTS

| 4,679,789 | A  | * | 7/1987 | Okada | A63F 13/10 463/23 |
| 6,106,395 | A  | * | 8/2000 | Begis | A63F 13/12 463/23 |
| 2009/0017913 | A1 | * | 1/2009 | Bell | A63F 13/12 463/40 |
| 2009/0149246 | A1 | * | 6/2009 | Opaluch | A63F 13/12 463/29 |
| 2012/0072497 | A1 | * | 3/2012 | Steiert | G06Q 50/01 709/204 |
| 2012/0115579 | A1 | * | 5/2012 | Buecheler | G07F 17/3295 463/23 |
| 2013/0090171 | A1 | * | 4/2013 | Holton | A63F 13/12 463/42 |

(Continued)

*Primary Examiner* — Steve Rowland
(74) *Attorney, Agent, or Firm* — Pearl Cohen Zedek Latzer Baratz LLP

(57) ABSTRACT

A method in support of providing customized gamification for accomplishing goals receives a request to generate a game framework, the request specifying a goal to be accomplished by one or more participants of a plurality of participants, at least in part through interaction with the game framework. A first set of one or more game parameters to be applied to the game framework is determined for at least a first participant of the plurality of participants, and the game framework comprising the first set of one or more game parameters is generated. The game framework comprising the first set of one or more game parameters is applied to a first profile relating to the first participant of the plurality of participants. The game framework can then be provided to an electronic computing device of the first participant over the network. Systems can be constructed to implement the methods described herein.

19 Claims, 19 Drawing Sheets

(56) References Cited

U.S. PATENT DOCUMENTS

| | | | |
|---|---|---|---|
| 2013/0225260 A1* | 8/2013 | Cudak | A63F 13/12 463/23 |
| 2014/0031129 A1* | 1/2014 | Morrison | A63F 13/12 463/42 |
| 2014/0038723 A1* | 2/2014 | Samdahl | A63F 13/12 463/42 |
| 2014/0179408 A1* | 6/2014 | Ducheneaut | G07F 17/326 463/23 |

* cited by examiner

| Test Markets | Audience | Game | Goal Doer | Goal Setter | Goal Scorer | Category | Sponsor | Goal |
|---|---|---|---|---|---|---|---|---|
| Physical Therapy | Patients | Do your exercise | Patient | Therapist | Patient | Health | Ace Athletics | 2x daily |
| Family | Soccer Moms | Brush Teeth | Young Kid | Parent | Parent | Health | Crest | 2x daily |
| Education | High School | SAT Prep | Teen | Kaplan | Teen | Mind | Kaplan | 2x daily |
| Education | Elementary School | Nightly Homework | Young Kid | Teacher | Parent | Mind | HALB | 1x daily |
| Education | Adult Males | Daf Yomi | Adult Male | Adult Male | Adult Male | Soul | Judaica Plus | 1x daily |
| Education | Soccer Moms | Practice Music | Kid | Music Teacher | Parent | Mind | 5Towns Music | Yx weekly |
| Medical | Diabetic | Test / Insulin | Diabetic | Doctor | Diabetic | Health | Endocrinologist | Yx daily |
| Medical | Epileptic | Take your medicine | Patient | Pharmacy | Patient | Health | Ezra Pharmacy | 1x daily |

Additional Test Games

| Test Markets | Audience | Game | Goal Doer | Goal Setter | Goal Scorer | Category | Sponsor | Goal |
|---|---|---|---|---|---|---|---|---|
| Family | Kids | Chores | Pre-Teen | Parent | Kid | Soul | Toys'R'Us | Yx weekly |
| Gym Members | Adults | Go to the Gym | Gym Goer | Gym Owner | Either | Health | Life Lock | Yx weekly |
| Spirituality | Adult Males | Go to Minyan | Adult Male | Synagogue | Adult Male | Soul | YIW | Yx weekly |
| Medical | Drug Takers | Take your medicine | Patient | Pharmacy | Patient | Health | Ezra Pharmacy | 1x daily |

Fig. 15

SYSTEMS AND METHODS IN SUPPORT OF PROVIDING CUSTOMIZED GAMIFICATION FOR ACCOMPLISHING GOALS

CROSS-REFERENCE TO RELATED APPLICATIONS

This patent application claims the benefit of priority from U.S. Provisional Patent Application Ser. No. 61/792,808, filed on Mar. 15, 2013, entitled "CENTRALIZED GAMIFICATION FOR THE LONG TAIL," which is hereby incorporated by reference as if set forth in its entirety herein.

FIELD OF THE INVENTION

The present invention relates to a centralized gamification platform, and more particularly, to systems and methods in support of providing customized gamification for accomplishing goals.

BACKGROUND OF THE INVENTION

People of all ages, religions, and walks of life aspire to improve themselves. People set goals in their daily lives as well as around life and calendar events (e.g., New Years resolutions). Most of these goals can fit into four categories and have either positive (e.g., exercise more) or negative (e.g., eat less) attributes. Four example categories include: Health (e.g., exercise, eating); Mind (e.g., learn, watch less television); Soul (e.g., socially responsible, save energy); and Money (e.g., spend less, earn more). There are many more than four categories but the variations are too long to list. Those skilled in the art of behavior modification and gaming can envision many more activities that can help achieve these goals. These could be one-off activities (e.g., clean up the garage), repetitive activities (e.g., exercise daily), or lofty aspirations (e.g., become an archeologist when I grow up).

Presently, systems and methods exist which attempt to help and encourage people to accomplish these goals. However, improvements are needed, including improvements that can, for example, allow users of such systems and methods to quickly and easily set up and customize those systems and methods for an individual or group, while being able to share them with others.

It is with respect to these and other considerations that the disclosure made herein is presented.

SUMMARY OF THE INVENTION

Technologies are presented here which describe systems and methods in support of providing customized gamification for accomplishing goals.

According to a first aspect, a method in support of providing customized gamification for accomplishing goals is disclosed. The method is performed by a server connected to a network and having a memory, a processor, and one or more code sets stored in the memory and executable in the processor. The method includes the steps of receiving, at the processor, a request to generate a game framework, wherein the request specifies a goal to be accomplished by one or more of a plurality of participants at least in part through interaction with the game framework; determining, using code executing in the processor, a first set of one or more game parameters to be applied to the game framework for at least a first participant of the plurality of participants; and generating, using code executing in the processor, the game framework comprising the first set of one or more game parameters. In addition, the method includes applying, using code executing in the processor, the game framework comprising the first set of one or more game parameters to a first profile relating to the first participant of the plurality of participants; and providing, using code executing in the processor, the game framework to an electronic computing device of the first participant over the network.

Methods in accordance with more particular aspects of the invention include further steps. For instance, the method can include tracking the first participant's interaction with the game framework on the electronic computing device while the participant attempts to accomplish the goal, computing a first score for the first participant based at least in part on the tracking step and the first set of one or more game parameters, and updating the first profile with the first score. The first set of one or more game parameters to be applied to the first profile can be determined based at least in part on a set of previously provided user information relating to the first participant.

Likewise, the method can further include providing the game framework to an electronic computing device of a second participant of the plurality of participants over the network; determining whether to perform one of the following: (i) apply the first set of one or more game parameters to a second profile relating to the second participant, (ii) determine a second set of one or more game parameters to be applied to the second profile relating to the second participant, or (iii) apply a third set of one or more game parameters provided by the second participant; and applying a determined set of one or more game parameters to the second profile relating to the second participant of the plurality of participants. The determined set of one or more game parameters to be applied to the second profile relating to the second participant can determined based at least in part on a set of previously provided user information relating to the second participant.

Furthermore, the method can include providing the game framework to an electronic computing device of a second participant of the plurality of participants over the network; receiving an input from the electronic computing device of the second participant, wherein the input comprises at least one of a message, information concerning the first participant's attempt to accomplish the goal, and a scoring computation relating to the first participant; and applying the at least one of the message, the information concerning the first participant's attempt to accomplish the goal, and the scoring computation to the first profile of the first participant of the plurality of participants.

Additional aspects of the method can include identifying one or more additional participants from the plurality of participants to whom a challenge notification can be provided to challenge the one or more additional participants to the game framework; providing the challenge notification to an electronic computing device of the one or more additional participants; receiving a challenge acceptance notification from the electronic computing device of the one or more additional participants indicating acceptance of the challenge; and providing the game framework to the electronic computing device of the one or more additional participants of the plurality of participants over the network. The identifying step can further comprise accessing a database comprising at least the first profile and profiles of the one or more additional participants, each profile including at least information about a goal to be accomplished by each participant; and identifying, based on the profiles, at least one of the one or more additional participants whose profile indicates a similar goal to that of the first participant.

Further aspects of the method can include classifying one or more game frameworks for accomplishing a particular goal as being part of a particular league framework; storing the one or more classified game frameworks and the particular league framework in a database of the server; enabling the electronic computing device of the first participant to access the database, wherein the first participant can browse the particular league framework and select one or more classified game frameworks to be provided to the electronic computing device of the first participant; and providing a selected one or more classified game frameworks to the electronic computing device of the first participant.

Additional aspects of the method can include identifying at least one potential sponsor to whom a sponsorship request can be provided, wherein a sponsorship comprises one or more incentives offered by a sponsor to the one or more of the plurality of participants to further encourage the one or more of the plurality of participants to accomplish the goal; providing the sponsorship request to a server of the at least one potential sponsor over the network based on the identifying step, wherein the sponsorship request comprises at least the goal to be accomplished by the one or more of the plurality of participants and the first set of one or more game parameters; receiving a sponsorship offer notification from the server of the at least one potential sponsor, wherein the sponsorship offer notification comprises a particular sponsorship relating to the goal to be accomplished by the one or more of the plurality of participants and the first set of one or more game parameters; and providing the sponsorship offer notification to the electronic computing device of the one or more of the plurality of participants over the network.

According to a second salient aspect of the invention, a system on which the methods described can be implemented is also disclosed. These and other aspects, features and advantages will be understood with reference to the following description of certain embodiments of the invention.

BRIEF DESCRIPTION OF THE FIGURES

FIG. 15 shows examples of alpha test cases and test games that may be used to test the game application, according to at least one embodiment of the invention;

DETAILED DESCRIPTION

The exemplary embodiments described herein relate to a system and method that allows users to set and accomplish goals. The exemplary embodiments use a concept termed "gamification" as an engagement model. Gamification refers to the concept of creating a game to accomplish the goal that is set by the user (or a third party) by incorporating technology to measure aspects of a person's daily life (e.g. food inputs, mood, and mental/physical performance) to ultimately improve activities and meet the desired goals.

The following provides an example of a gamification of a user's goal by employing the systems and methods described here. In this example, the user has decided that they want to become healthier by exercising more. In this case, the specific challenge is for the user to skip taking the escalator and walk up the stairs instead. The goal the user has set is a specific number of days that the user will walk the stairs. In this example, the user has decided that the goal is 57 days, which will beat Joe DiMaggio's record of a 56 game hitting streak. The user may also set a reward for accomplishing the goals, e.g., I will buy myself Yankee tickets if I accomplish the goal. As will be described in greater detail below, the exemplary embodiments provide a tool to aid the user in accomplishing the goal such as a mobile (or web) application in the form of a game, as well as a support group of friends and/or other participants.

Since, the mobile application is in the form of a game, it can also be extended to be a multi-player game. That is, other people may join the game as either an active participant ("participant") or as a supporting participant ("supporter"). For example, a first friend may join as a participant. A second friend may join as a participant with a change (e.g., my reward will be Mets tickets). A third friend may join as a participant who changes the challenge (e.g., I can double it and do 114 days). A fourth friend may simply join as a supporter (e.g., will cheer you on). Finally, a fifth friend may join, but make a competitive game of it (e.g., loser buys the tickets). Those skilled in the art will understand that there can be many more variations on the multi-player game and the above are just a few examples.

Figure 1:
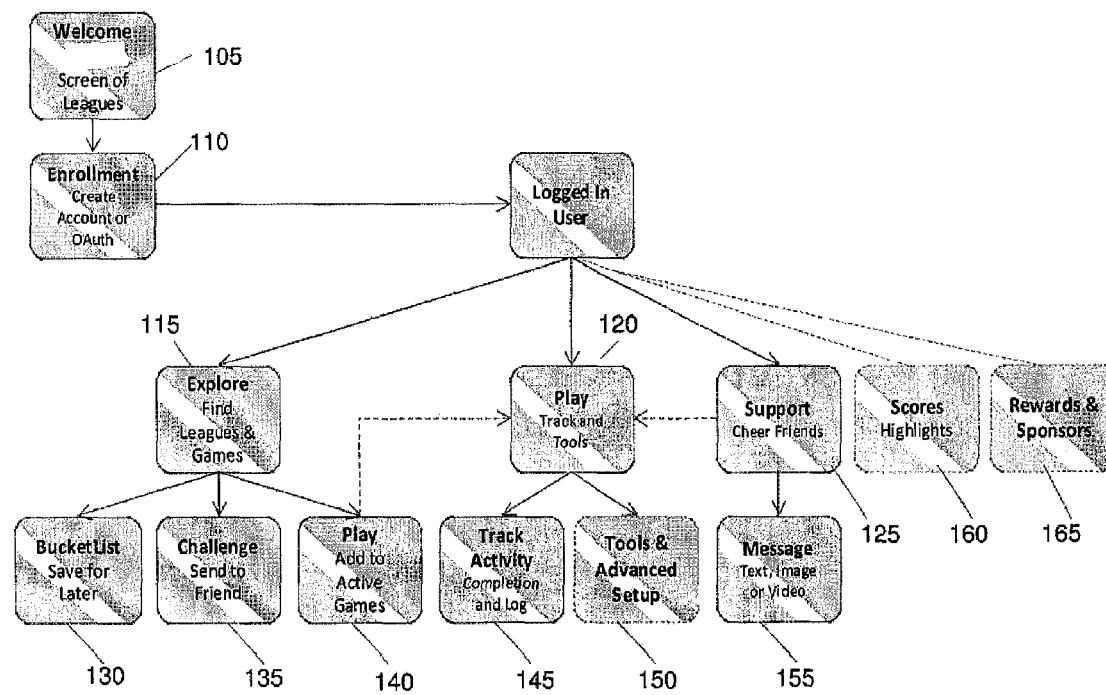
FIG. 1 shows an exemplary overview of a game application, according to at least one embodiment of the invention.

FIG. 1 shows an exemplary overview of a game application 100, in accordance with various embodiments of the invention. As will be explained in detail in FIG. 17, game application 100 can represent computer program code stored in memory of a server and executing in a processor of the server to configure the server to perform the various functions and functionalities described herein. The overview shows that the game application 100 includes a welcome screen 105, an enrollment screen 110, an explore functionality 115, a play functionality 120 and a support functionality 125. The explore functionality 115 includes sub-functionalities of a bucket-list functionality 130 and a challenge functionality 135. The explore functionality 115 also includes an add functionality 140 that links directly to the play functionality 120. The play functionality 120 includes sub-functionalities to track activities 145 and a tool and advanced set up functionality 150. The support functionality 125 includes messaging sub functionality 155. In addition, the game application 100 also includes scores and highlights functionality 160 and rewards and sponsors functionalities 165. Each of these screens/functionalities 105-165 of the game application 100 will be described in further detail below. However, before a further discussion of these screens/functionalities 105-165, it will be noted that the overview illustrates that the underlying structure or framework of the game application 100 can be generic. That is, the game application 100 is applicable to any game that the user desires to play. For example, no separate application is required for a health related goal, as compared to a money related goal. All games and corresponding goals can be within the same game application 100 structure/framework. Thus, a user does not have to download or maintain multiple applications to attempt to reach goals in different areas of their lives, but can join multiple games within the same application. These games can span personal (e.g., self-improvement), interpersonal (e.g., training children to brush teeth or husbands to take out the garbage), communal (e.g., share feedback to preacher on a given sermon), job-related (e.g., be on time, sell 5 pair of shoes by 12:00 pm), medical (e.g., do physical therapy exercises, take insulin), etc. These can be set individually or by a coach, parent, music teacher, doctor, spouse, therapist, etc. Those skilled in the art will understand that the number and type of games are not limited. By customizing the underlying game framework, users can create games for improving any desired area of life and/or accomplishing any goal.

The welcome screen 105 can be in any format and include any amount or type of information. For example, the welcome screen 105 can include a list of games or leagues that the user has joined or may simply be a list of all the leagues that a user may join. The welcome screen 105 can show games that the user has been challenged to play. The concept of a game, a league and a challenge within the context of the exemplary embodiments will be described in greater detail below.

The enrollment screen 110 can include a request for any type of enrollment information that may be required from the user to join a league or game, including providing basic personal data, such as in a user profile or user account. For example, there can be different user set-ups for games and/or leagues. In one example, a user can only join leagues or games wherein a friend or contact of the user has also joined. Thus, the enrollment screen 110 can require the user to identify a friend that is also in the game and/or league the user wants to join. In other examples, the enrollment can simply require information that is relevant to the game. For example, if the game is a weight loss game, the enrollment information can include the user's weight. In other examples, the user can provide preference data to be used by the server to analyze a user's preferences and provide recommended games. Those skilled in the art will understand that the user may not have to access the game application 100 and its corresponding functionality via the enrollment screen 110 upon every access. The enrollment screen 110 may be a one-time or periodic screen that the user needs to configure for access to the game application 100 (e.g., create an account or profile). The enrollment screen 110 can also be used to identify other users that are friends and/or contacts of the current user. However, the identification of friends/contacts may also be accomplished in other manners.

As shown in FIG. 1, after the enrollment screen 110 (or the welcome screen 105 if the enrollment screen 110 is not needed for this login), in accordance with embodiments of the invention, the user will be logged into the game application 100. At this point, the user has several options for progressing through the game application 100. Each of these options will be described below, but it will be understood that it is not necessary to proceed in the order described below, as the game application 100 will support any order.

Figure 2:
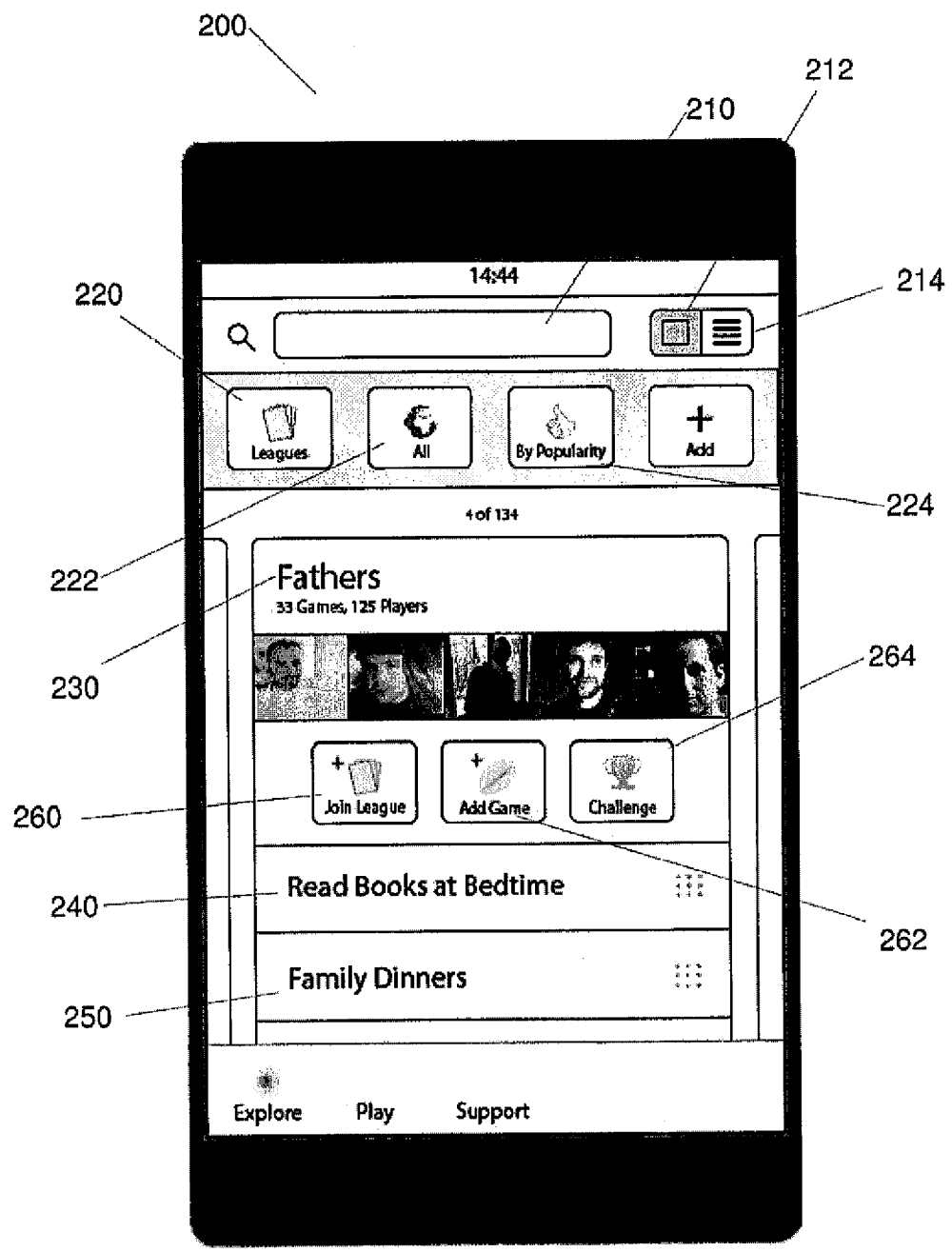
FIG. 2 shows a first example of an explore screen of the game application in league mode, according to at least one embodiment of the invention.

The first described functionality is the explore functionality 115 that assists the user in finding existing leagues and/or games that the user desires to play. FIG. 2 shows a first example of an explore screen 200 of the game application 100. In this example, the search screen 200 includes a search area 210 where the user can type in a free form search to search for different leagues and/or games. It should be noted that all the search screens may include such a free form search area and it will not be described in greater detail below.

The league button 220 indicates that the user is viewing the explore screen 200 in a league view. As described above, the game application 100 includes games and leagues. Leagues are generally considered a category level that will include multiple games. However, a league is also intended to represent more than just a category. In one embodiment, a league is intended to represent a group of people targeting the same or similar ultimate goal (e.g., be a better father). These groups are typically not public groups, but are rather groups of associated contacts and/or friends. A league is intended to be a subgroup of people within a particular user's "network" trying to accomplish the same goal. In a second embodiment a league is intended to include people who specifically want to connect outside of their group (i.e., are not contacts/friends of a user), such as, for example, an alcoholics anonymous group. Accordingly, the system can specifically prevent people who know each other or are otherwise connected from joining the same group for specific types of leagues by, for example, comparing contact lists of each user, etc.

In the example of FIG. 2, the league is displayed as a Fathers league 230. As shown in this example, there are 33 games. Two (2) of the 33 games are displayed on the screen 200 and include read books at bedtime 240 and family dinners 250. The read books at bedtime 240 and family dinners 250 are specific tasks or games (such as the walk up the stairs game described above) that are aimed at the category of fathers (or more accurately being a better father). Those skilled in the art will understand that the user may scroll vertically down through the entire list of 33 games using any standard user interface functionality such as a scroll bar or touch screen scrolling. Similarly, the user may browse through the different leagues by scrolling horizontally in any standard manner. It should also be noted that the leagues and games on screen 200 are shown in pane form as is shown by the highlighted pane button 212. However, the user can also select the list button 214 that will cause the display to show the leagues and games in list form.

It is further noted that in this display screen 200, all the leagues are being displayed (or searched) as indicated by the button 222 ("All"). However, it is also possible that button 222 may be configured to filter the displayed leagues to, for example, only the leagues that the user has already joined ("Mine") or only the leagues that friends/contacts of the user have joined ("Friends"). Other types of filters may also be used for display. In addition, the display screen 200 is also displaying the leagues and/or games in an order determined by popularity as indicated by the button 224 ("By Popularity"). Other manners of displaying the leagues and/or games may also be used such as alphabetical order, by most recent, etc. Other visualizations of leagues and game can also be used. For example, a "subway map" layout entitled "be a better father" can display a train representing a user (in this case, a father), and different "stops" along the map can be labeled "read to kids," "dinner with kids," etc. Of course many other visualizations are also possible. Those skilled in the art will understand that many more filters can be created to enhance the user's ability to find leagues and games of interest.

The explore screen also includes buttons 260-264. The join league button 260 allows the user to join the particular league that is currently being displayed. As described above, a league is a category level that may be considered as analogous to a community of people looking to tackle a goal such as, for example, gamblers anonymous, alcoholics anonymous, kids dreaming of being astronauts, etc. Thus, it is possible to join a community (league) without actually selecting a game for active play in the league. The user may eventually add a game to play or keep it in the user's "bucket-list" (which is described in detail below) until the user is ready to do something to advance to the goal. The add game button 262 allows the user to add a new game. For example, if the user is in a desired league, but cannot find a game that is appropriate, the user may build a customized game. In some embodiments, a user can choose a goal (skip the escalator and take the stairs). The system on which the game application 100 is executing can automatically set a game parameter to once-per-week activity, or can determine any other optimal game parameter. Users can immediately or later adjust the recommended game parameter to any desired number of days a week or month, etc. The challenge button 264 activates the challenge functionality 135 that allows the user to challenge another user to the game that is highlighted. For example, the user can select the challenge button 264 and this will lead the user to a further screen that can allow the user to either enter a friend/contact or select a friend/contact (multiple friends, or group of friends) from a list to challenge to the selected game. The message can be intelligently pre-populated (e.g., "Dear Dina, I've been playing this game for 3 weeks and have succeeded 68% of the time. It would really help motivate me if you joined and we did it together.") The game application 100 will then send a message to the challenged user indicating that the current user has challenged them to a game. This message may simply be a message that shows up the next time the challenged user opens the game application 100 or may be a message delivered via a different system such as an email or text message.

Figure 3:
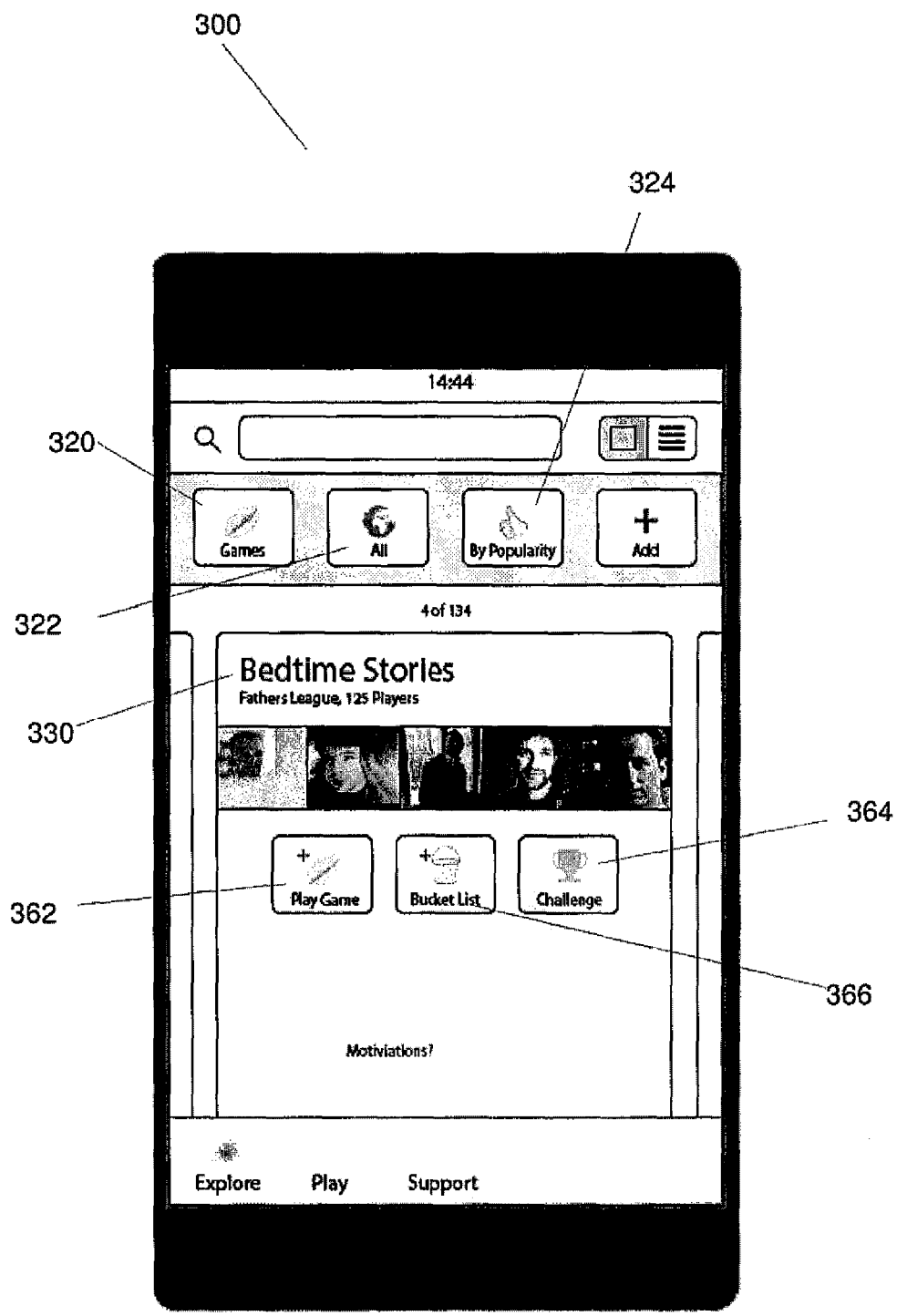
FIG. 3 shows a second example of an explore screen of the game application in game mode, according to at least one embodiment of the invention.

FIG. 3 shows a second example of an explore screen 300 of the game application 100. The explore screen 300 is similar to the explore screen 200, except that as shown by games button 320 the explore screen 300 is showing games rather than leagues. In this example, the explore screen 300 is showing the game bedtime stories 330. Again, the display of this game may be the result of a free-form search or any of the filters associated with buttons 322 and 324 that may include the same or different filtering functionalities as described above with reference to the buttons 222 and 224, respectively. Also, the user may scroll through the different games using any standard user interface scrolling method such as touch screen swipe scrolling. The explore screen 300 also includes a play game button 362 and a challenge button 364 that correspond to the same functionality as described above for the buttons 262 and 264, respectively.

The explore screen 300 also includes a bucket list button 366 that corresponds to the bucket list functionality 130. The bucket list functionality 130 is a list of games that the user may wish to play in the future. For example, the user may have searched for a variety of games related to being a better father. This may have resulted in the display of a number of games including the bedtime stories game 330. The user may find the bedtime stories game 330 interesting, but does not want to join the game at this time for any number of a variety of reasons (e.g., the user has not decided the exact goal or the parameters of the goal). Using the bucket list button 366, the user may add the bedtime stories game 3330 to the user's bucket list (e.g., in or associated with the user's profile). The explore functionality 115 (or other functionality) may allow the user to display the games the user has saved to the bucket list at a later date where the user can then apply the play functionality 120 or the challenge functionality 135 to the game. In this way, the user does not have to remember the games the user finds interesting, but may merely save the games to the bucket list and the game application 100 remembers the games for the user. This may also allow friends to "cheer" for the user to join and actively participate, as described below.

Figure 4:
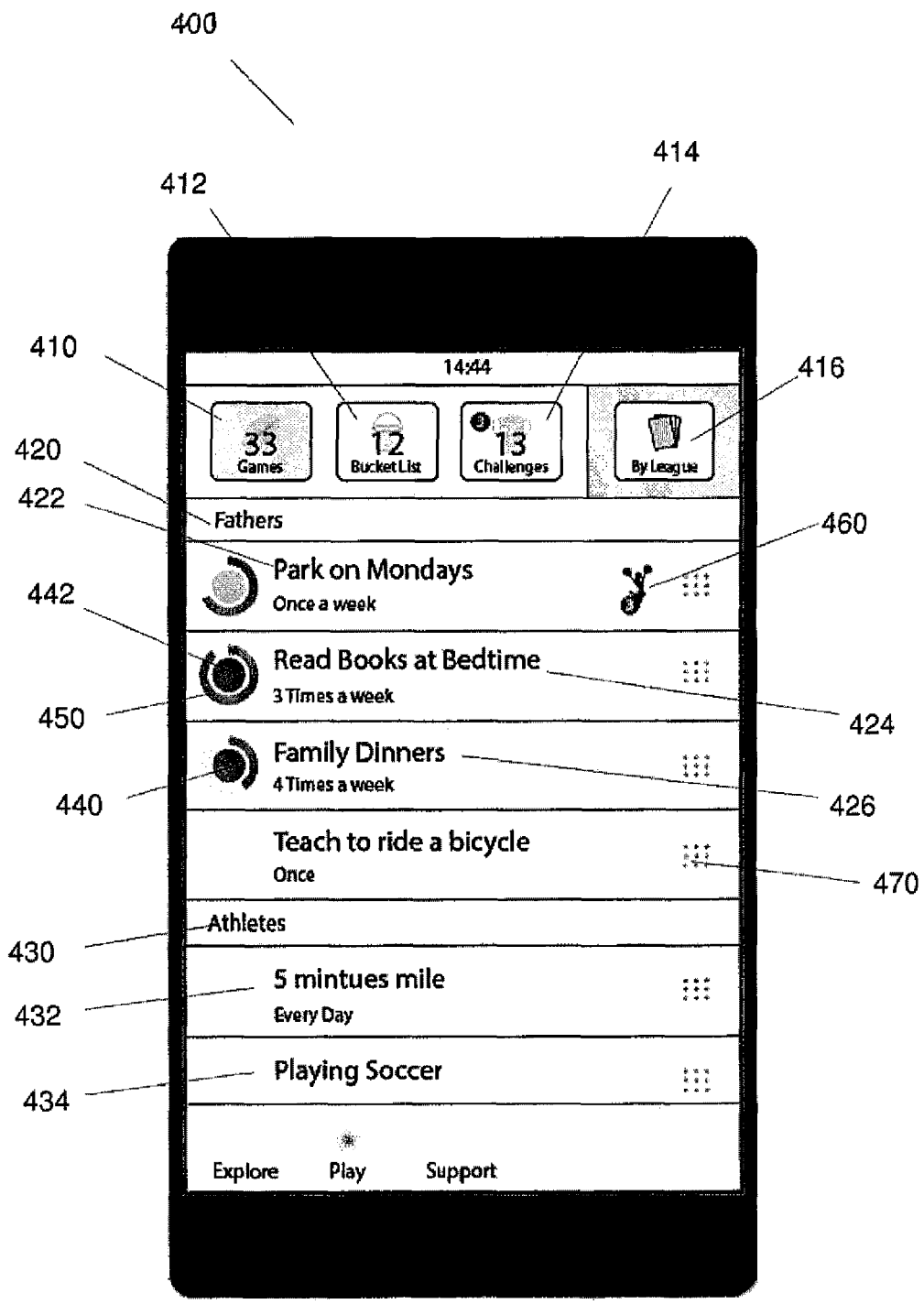
FIG. 4 shows an example of a play screen of the game application, according to at least one embodiment of the invention.

The next described functionality is the play functionality 120. The play functionality 120 may be entered directly after the welcome screen 105 or enrollment screen 110 or may be entered as a result of an action taken on another screen. FIG. 4 shows an example of a play screen 400 of the game application 100. The play screen 400 shows all the games the user is currently playing. This is indicated by the highlighting of the button 410 that indicates the player is actively playing 33 games. Each of these active games can be displayed by league and/or game name. For example, on the screen 400, the leagues fathers 420 and athletes 430 are displayed. Under each of these leagues 420, 430 a variety of games 422-426 and 432-434, respectively, are listed. Again, those skilled in the art will understand that the user can scroll down through the list to see the additional games and leagues that the user is currently playing. It should also be noted that in this example leagues list the games because this user has elected to organize and display the games in this manner as shown by the highlighting of button 416. Of course, the button 416 may also include other ways of organizing the games for display such as alphabetical order, by success, by urgency, by cheers, etc. The concepts of success, urgency and cheers in relation to the exemplary embodiments will be described in more detail below.

The play screen 400 can also have an additional screen that can ask the user to pick frequency or add details. For example, if there is a game "read kids at bed time," the initial setting of the goal may be four times per month and the user may want to edit this to be three times per week. The user may also want to personalize the game by sharing more details about the types of books (sports, religion, etc.). Furthermore, in accordance with embodiments of the invention, the game application 100 can configure the server to determine game parameters for any given game. These game parameters can be based on the type of goal to be accomplished, information in the user's profile, information provided by the user and/or a third party, information of multiple users, etc. A game parameter can be, for example, how often an activity should be performed (e.g., a number of times per day, week, month, etc.), what qualifies as performing an activity for a particular game, what percentage of an activity must be completed before the activity is considered complete, etc. Those of ordinary skill in the arts will understand that number types and combinations of game parameters can be applied to a given game and/or league, in order to assist a user or group of users in accomplishing a particular goal. As discussed in further detail below, game parameters are used to customize a game framework (game) for a user or group of users.

The screen 400 also includes a bucket list button 412. As described above, the bucket list includes those games that the user finds interesting or is otherwise considering playing, but has not yet decided to actively play. Thus, if the user selects the bucket list button 412, a further display screen will display those games that the user has placed in the bucket list (in this example, 12 games) in the same manner as described above for the active games. The user may then elect to move these games to the active list, remove from the bucket list or simply leave on the bucket list to make a decision about these games at a later time.

The screen 400 also includes a challenge button 414. As described above, a user can challenge another user to play a game. Thus, if the user selects the challenge button 414, a further display screen will list those games to which the user has challenged other users or those games to which other users have challenged the user. The list of challenge games can be further broken down into those games where the challenge has been accepted and those games where a challenge is still pending. In this example, the button 414 shows there are 13 games where the challenge has been accepted and 3 games with pending challenges. Furthermore, in accordance with embodiments of the invention, the game application 100 can configure the server to identify one or more other users to whom a challenge should be provided based on, for example, similar goals to be accomplished, similar profiles, etc. As explained above, depending on the type of game and/or goal, identified users may be users who are friends of the original user, users who share contacts with the original user, and users who are outside of the original user's network of connections/friends.

The listing of the games can also include additional information for the user. In a first example, the additional information can include the urgency of the game. The urgency can refer to whether a user action is required for the game. The urgency can be displayed as a colored button next to the game, for example, button 440, next to the listing of the family dinner game 426. FIG. 4 is shown in gray scale and therefore does not show color, but those skilled in the art will understand that different levels of urgency may be listed as, for example, red for very urgent, yellow for moderate urgency and green for low urgency. As stated above, urgency refers to whether a user has to take an action with respect to the game. For example, the family dinner game 426 shows that the goal is four (4) family dinners each week (Sunday to Saturday). It may be Wednesday and the user may have indicated that the user has already had family dinner on Sunday through Wednesday, completing the goal for this week. Thus, there is no urgent action with respect to this game and the user and the button 440 may be green. In contrast, the read books at bedtime game 424 shows that the goal is three (3) times per week, and it may be the same Wednesday, but the user has not indicated that he has completed even a single day. In this case, there is urgent action required for the user to meet the goal. In this case, the corresponding button 442 may be red. Those skilled in the art will understand that other color schemes or other manners of displaying urgency (e.g., exclamation marks, yield signs, etc.) can also be used.

The user may also click on the urgency button to receive more information concerning the urgency. Carrying through with the example of the family dinner game 426, the further information can state that the user has completed the goals for this week. Those skilled in the art will understand that other types information concerning urgency may also be displayed.

Additionally or alternatively, the additional information can include the success of the user. The success may be a measure of how many times (or a percentage of times) the user has accomplished the goal that is set for the game. The success can be displayed, for example, using a ring chart 450 such as shown next to the read books at bedtime game 422 and surrounding the corresponding urgency button 442. The ring chart 450 can be colored more darkly for that percentage of times that the user has completed the goal. The user can click on the ring chart to receive more detailed information concerning the success. Of course, other forms of visual representation are also possible.

Figure 5:
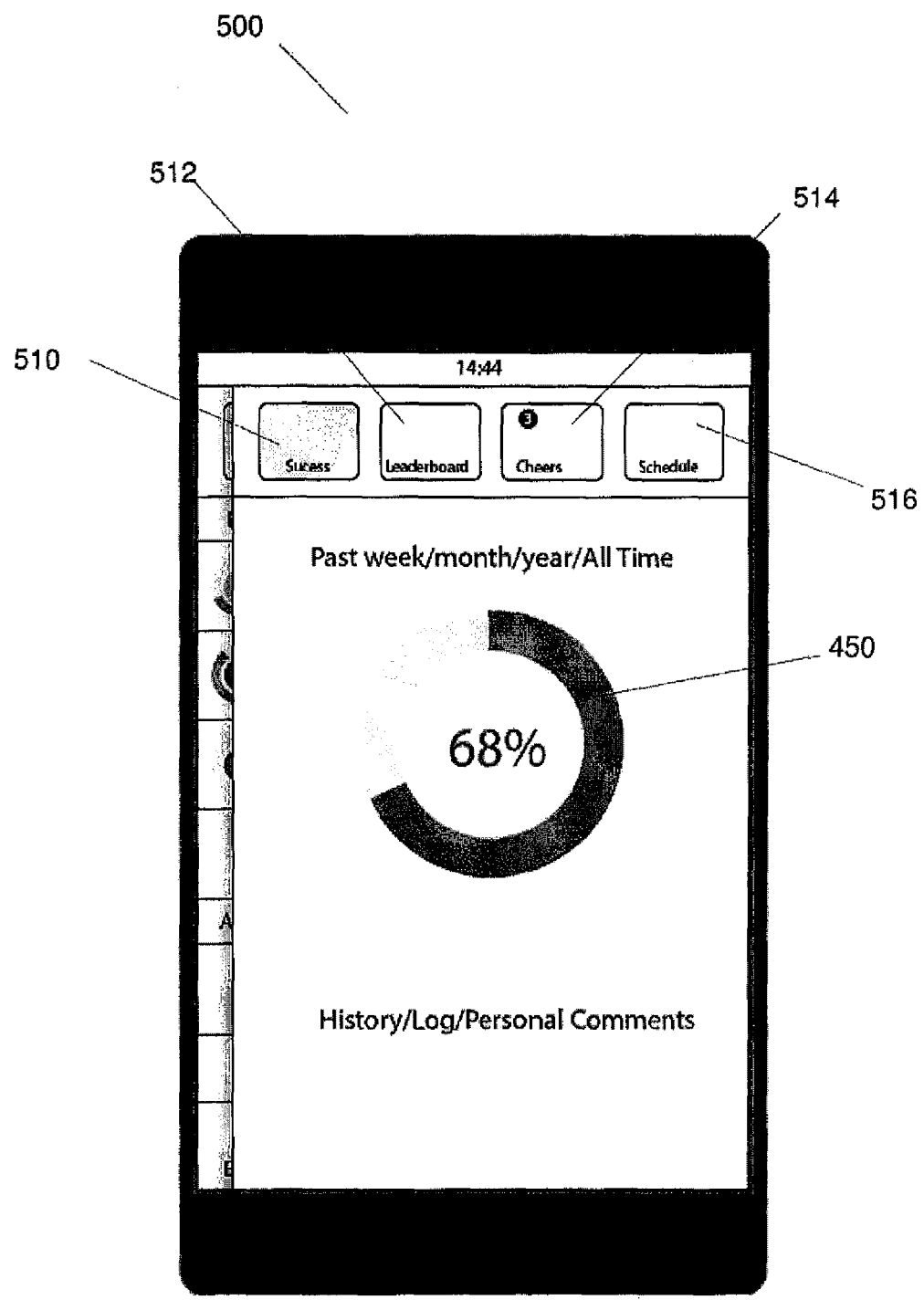
FIG. 5 shows an exemplary success screen for the game application, according to at least one embodiment of the invention.

FIG. 5 shows an exemplary success screen 500 for the game application 100. The exemplary success screen shows the ring chart 450 in more detail and may be accessed, for example, by clicking on the ring chart 450 in display screen 400. It is noted that the ring charts shown on these screens are only exemplary and that the ring chart 450 on screens 400 and 500 appear slightly different, but in actuality, they can appear the same (e.g., the same percentage of the ring chart can be highlighted). As shown in screen 500, the user has completed the goals of this game 68 % of the time (e.g., the user has read 3 books at bedtime, 68% of the weeks that the user has been playing this game) and this corresponds to the percentage of the ring chart 450 that is highlighted. It is noted that other measures of success can also be displayed for each game. In the example of the read books at bedtime game other types of success may be, for example, an absolute number of times the activity was performed (e.g., number of books read), the absolute number of weeks the goal was completed, the number of consecutive weeks the goal was completed, etc. These game parameters can be determined by the system for the user, provided by the user, provided by a third party for the user, etc.

There may also include a sponsor (e.g., Barnes & Nobles) that offers an incentive or reward (e.g., store credit) as a user's success grows. Furthermore, in accordance with embodiments of the invention, the game application 100 can configure the server to identify one or more potential sponsors based on the particular goal and/or game details and/or information provided by users. Sponsors can provide users with additional incentives to complete tasks, track their performance, etc., as explained in further detail below.

The highlighting of the button 510 shows that the current success screen 500 is being displayed. However, the user can also select button 512 that will display the leaderboard for the game based on the success measure. This leaderboard can have any number of types of leaderboards such as all the members of the league and/or game, only those members that are friends/contacts of the user, only those members that are part of a specific challenge, etc. The button 512 may also be pressed by the user to show how many cheers the user has for this game and can list the friends who provided those cheers. The page itself could be a motivational board with text, video and images to further motivate the user to accomplish his/her goal. The cheers are described in greater detail below. The schedule button 516 is an edit button which allows the user to edit the original game parameters assigned to the game framework. For example, the frequency originally assigned to the game (2× a week, 2× a day, etc.) can be adjusted manually.

In a third example, the additional information may include the number of cheers that the user has received for playing the game. Referring back to screen 400, the park on Monday game 422 shows a corresponding cheer icon 460 with the number three (3) indicating that the user has received three cheers from friends for the user's activity with respect to this game. The method of providing a cheer to a friend will be described in greater detail below.

The icon 470 may be used to record the completion of an activity. This completion may be through the use of a simple checkbox that indicates a task has been completed. In addition, the user may also add text about the activity. If the game is sent by a teacher for children and the challenge is "do something nice for your parents", a child could, for example, enter "yes I did it" and provide details (e.g. I took out the garbage, cleaned my room, etc.). Using, for example, natural language processing and/or text recognition, the game application 100 can configure the server to interpret such entries as indicating that a task has been completed.

In some embodiments, users can be prompted to provide a text input or a vocalized (speech) response relating to performance of an activity, so that data can be extracted from the user's speech. The response is converted to text so that its substance can be processed like any other textual response. In some implementations, a natural language processing (NLP) algorithm is used to establish an expected response signal which can include interim operations before the expected response signal is established. The interim operations performed by the natural language processing algorithm can be based on statistical machine learning in which a learning algorithm based on, say, statistical inference, is used to automatically learn rules through the analysis of large textual corpora of examples, preferably an annotated corpora that includes part-of-speech tagging (in which information about each word's part of speech (verb, noun, adjective, etc.) is added to the corpus in the form of tags) or the lemma (base) of each word. The automatically learned rules can then be applied to the inputted features included in the text of the responses of users and other user data provided to the game application 100. Such rules, as understood in the art of NLP, apply statistical models which make probabilistic decisions based on real-valued weights that are associated with each input feature.

Statistical models of this type can express the relative certainty of different possible answers rather than only one, and thereby produce more reliable results. As such, the interim operations in such implementations provide weightings to a set of probabilistic decisions so that those decisions that have the highest weightings are selected for the determination as to an aspect of the completion of a task by the user, with the expected response signal being established based on those decisions. A single decision with the highest rating can be selected, or the results with the highest statistical likelihood of pertinence can then be compared to a hard-coded rule base for a match within prescribed criterion (criteria) in order to establish the expected response signal.

Referring back to FIG. 1, the play functionality can also include the track activity functionality 145. As was described above with reference to the screens 400 and 500 related to the play functionality 120, the screens 400 and 500 show the active games and information for the user relating to these active games. However, the game application 100 can configure the server to keep track of the user's activities to display this information to the user. In some embodiments this includes tracking the user's interaction with the game application 100 (e.g., entering information relating to completed tasks, etc.). In some embodiments this can further include receiving information from one or more sensors integrated in a mobile computing device (e.g., a smartphone, etc.) of the user. For example, a global positioning system (GPS) and accelerometer in the user's mobile phone can indicate that a user accomplished a given task, such as running a mile on a given day, and provide the information to the game application 100. Those of ordinary skill in the arts will recognize that many other sensors, programs, and devices can be used to provide information relating to activity tracking directly to the server on behalf of a user, as described further below.

In some instances, the track activity functionality 145 will present the user with an input screen so the user may self-report that an activity or task has been completed. Each game may have a different track activity screen depending on the type of tasks that need to be completed. As described above, a simple example of tracking could be merely a checkbox indicating that an activity was completed. However, there may also be more complex tracking activities. For example, the read books at bedtime game 422 may include a track activity screen that allows the user to check the days of the week that the reading took place and the number of books, chapters, and/or pages read on the particular day. In other instances, the game application 100 may accept inputs from other software applications or hardware devices that indicate an activity has been completed. For example, there are some types of exercise equipment such as treadmills that record the time and/or distance that the user has run and download this to an application on a user's device such as a mobile phone. If the game application 100 is on the same device, for example, this distance and/or time may be exchanged with the treadmill software application to track the user's activity. Other examples may include web-based applications that the game application 100 may access to track a user's activity. In a further example, application programming interfaces (APIs) may be created and/or accessed to allow secondary systems to report success into the game application 100 and vice versa (allow the game application 100 to report to other systems).

Figure 6:
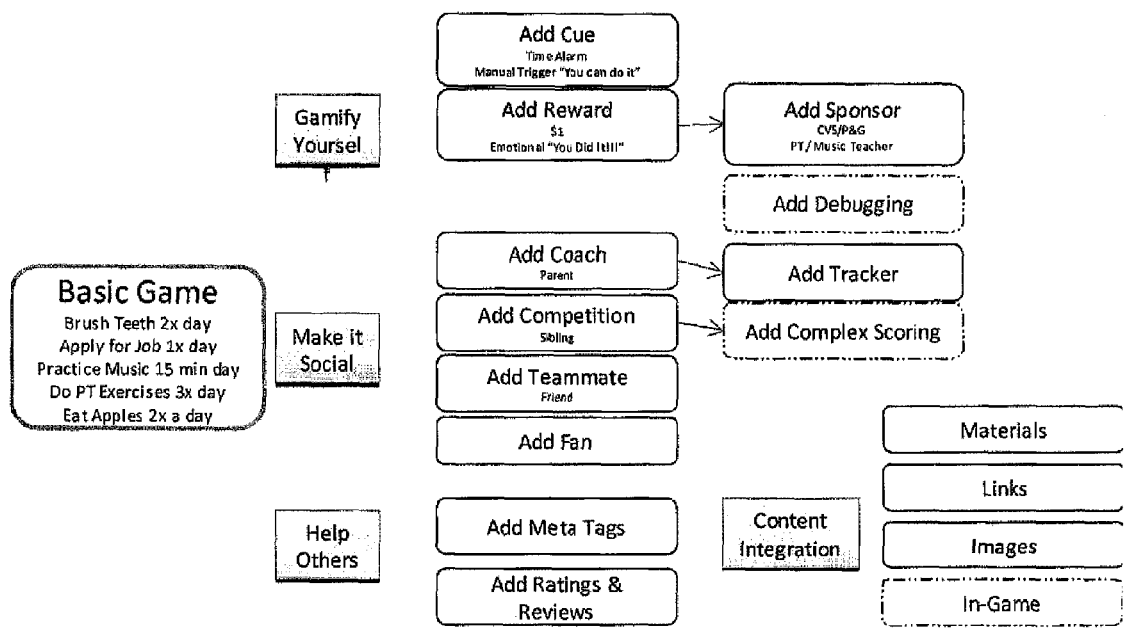
FIG. 6 shows an exemplary overview of the tools and advanced setup functionality of the game application, according to at least one embodiment of the invention.

The play functionality 120 also includes the tools and advanced setup functionality 150. FIG. 6 shows an exemplary overview of the tools and advanced setup functionality 150 of the game application 100. The tools and advanced setup functionality 150 allows the user to customize an existing game. FIG. 6 shows multiple examples of customizations that may be added to a game.

The play functionality 120 may also include the ability to send texts, images, or video related to the activity. For example, if the activity is teaching a child to ride a bike, the message functionality may allow the user to post a video of the child riding the bike.

In another example, the message functionality may allow the user to post comments on social networks such as Facebook and Twitter.

Figure 7:
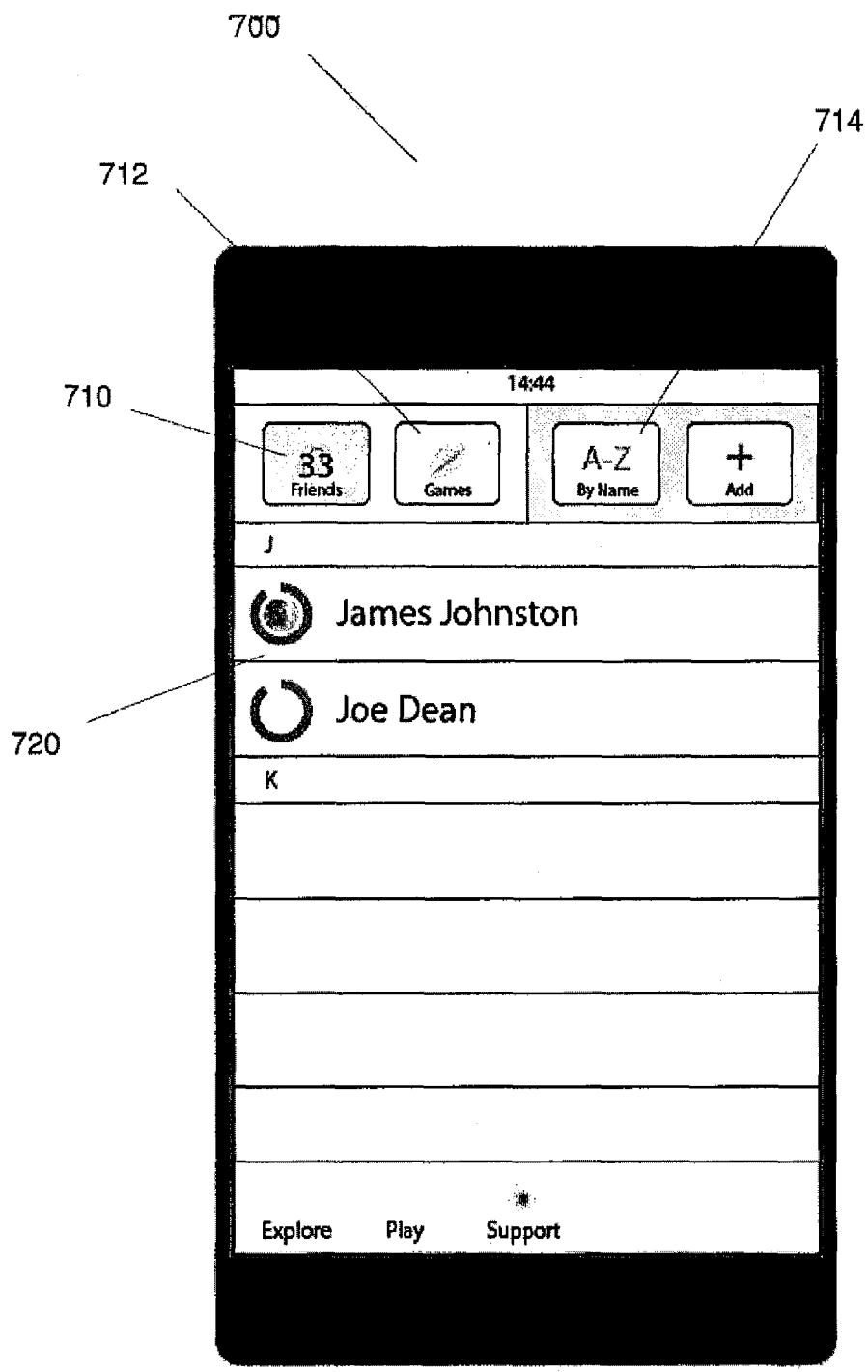
FIG. 7 shows a first example of a support screen of the game application by person, according to at least one embodiment of the invention.

The support functionality 125 allows users to support their friends by sending cheers to the friends for their accomplishments or to encourage the friends/contacts in the games they are playing. FIG. 7 shows a first example of a support screen 700 of the game application 100. As shown in support screen 700, the user's friends are displayed in alphabetical order as shown by the friends button 710 and by the name button 714. Based on these selections, the user's friends are displayed in area 720. The friends button 710 indicates the user has 33 friends and those skilled in the art will understand that the user can scroll through the alphabetical list to see the other friends. Also, it is possible to filter the friends in other manners. For example, the name button 714 can also include the functionality to sort by success (e.g., those friends that have been successful and who would receive the most cheers, or those friends who have been the least successful and need the most encouragement) or by similarity (e.g., those friends that have the most games in common with the user or have similar scores to the user).

Figure 8:
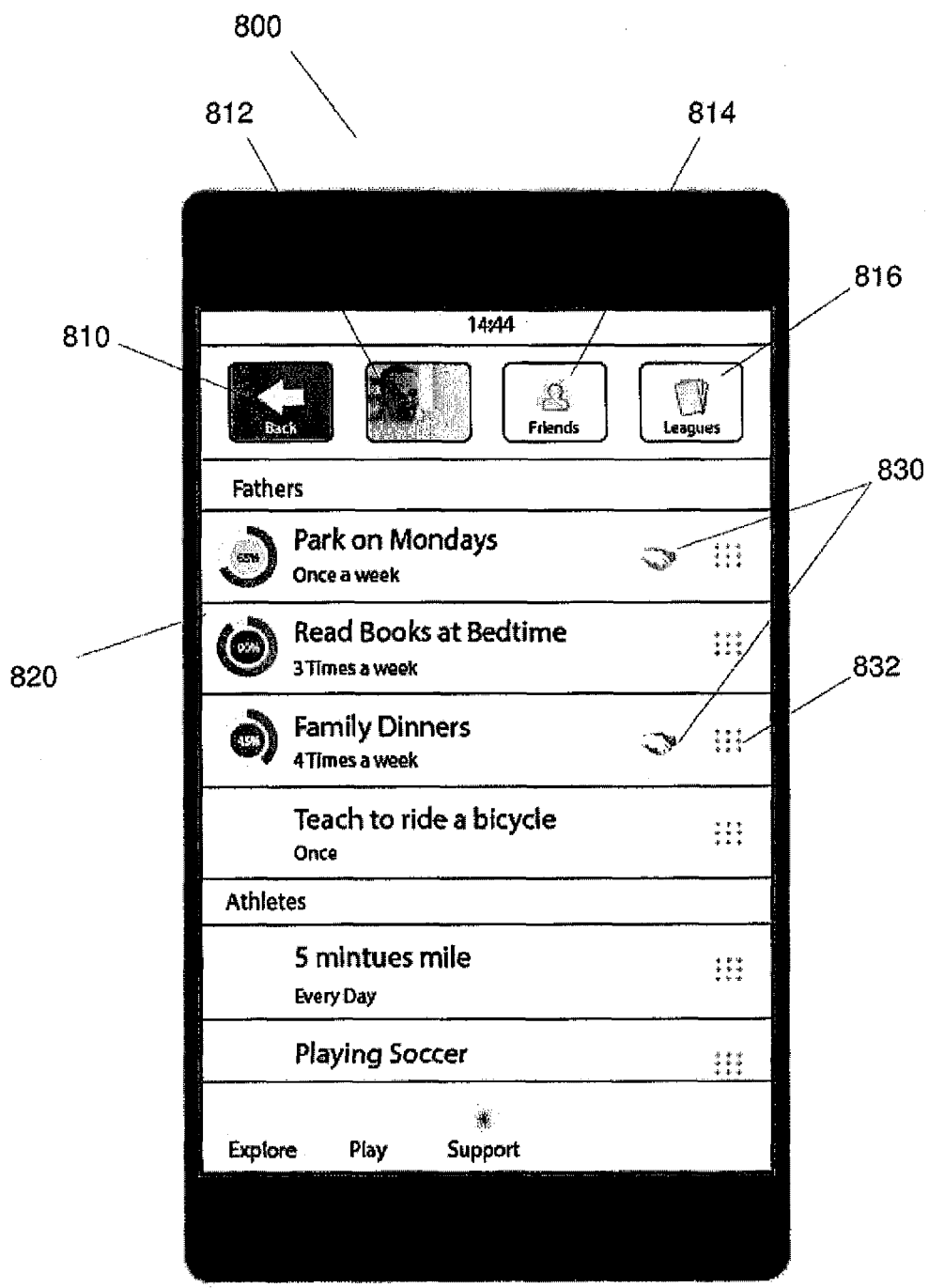
FIG. 8 shows a first exemplary friend support screen of the game application, according to at least one embodiment of the invention.

The user may select one of the friends displayed in the area 720 to display additional information concerning this friend. In this example, the user selected James Johnston. FIG. 8 shows a first exemplary friend support screen 800 of the game application 100. This is the friend support screen 800 for James Johnston. The back button 810 takes the user back to the screen from which the user navigated (in this example, the support screen 700), the button 812 shows that the user is viewing the James Johnston support screen, the button 814 allows the user to leave this screen and display James' friends, and the button 816 allows the user to filter further by league.

Since this is James Johnston's support screen, the area 820 shows all the games that James Johnston is currently playing. This is organized by league and game, but can also be organized in any of the manners that were described above for displaying the user's active games. The entry for each game also shows the additional information such as urgency and success as were described above. In addition, in some embodiments there can be a handshake icon 830 shown next to the games that the user and the friend have in common. These are only exemplary screens so there may be more or less games in common. Finally, there can be a dot icon 832 next to each game that allows the user to send a cheer to the friend for that game. If the user selects the dot icon 832, the game application 100 sends the cheer to the user's friend and the cheer shows up on the friend's game application as a cheer and identifies the user that sent the cheer. As described above, the cheer may be used to congratulate or encourage the friend for the particular game, add image (e.g. picture of thumbs up) or add video (e.g. kid saying "way to go dad" or "you can do it"). In some embodiments, the cheer can also be information relating to the user's attempt to accomplish the goal. Such information can be interpreted by the game application 100 in order to track activity, as described above. For example, a wife can describe activity of a husband indicating the husband has performed physical activity for an exercise game.

Furthermore, in some embodiments, users can track any of the games that friends list as public on their own profiles. A coaching functionality can allow the user to quickly see all the games of friends that the friends have failed to play or interact with in a given period of time. The user can then, for example, "nudge" (low level), "poke" (medium level), or "kick" (high level) a friend to encourage the friend to re-engage the game and attempt to accomplish the goal. The game application 100 can display a board for a user of all the nudges, etc., from multiple friends and try to accomplish games to clear the board.

Figure 9:
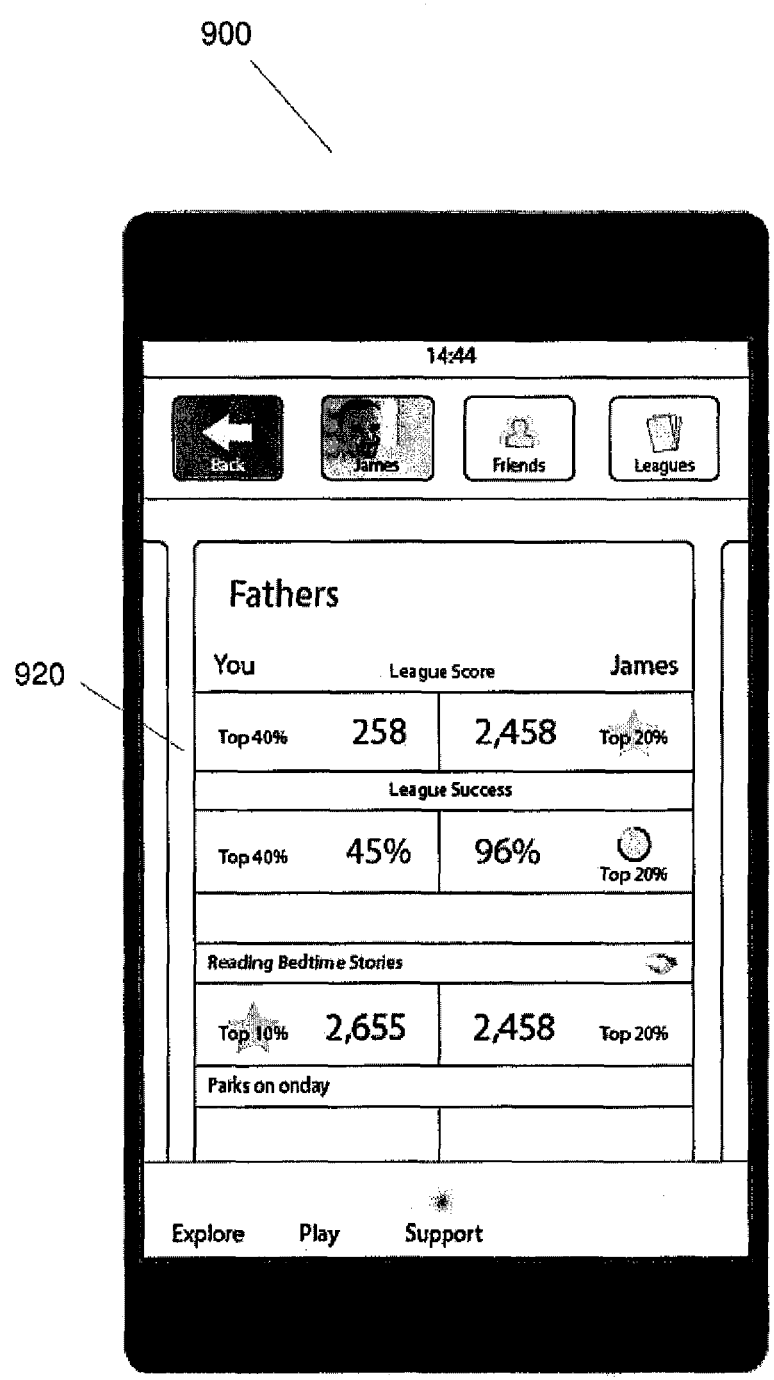
FIG. 9 shows a second exemplary friend support screen of the game application, according to at least one embodiment of the invention.

FIG. 9 shows a second exemplary friend support screen 900 of the game application 100. The user may advance to the support screen 900, for example, by pressing the league button 816 on the support screen 800. The support screen 900 shows the comparison in area 920 between the user and the friend for the different leagues and different games that the user and the friend have in common.

Figure 10:
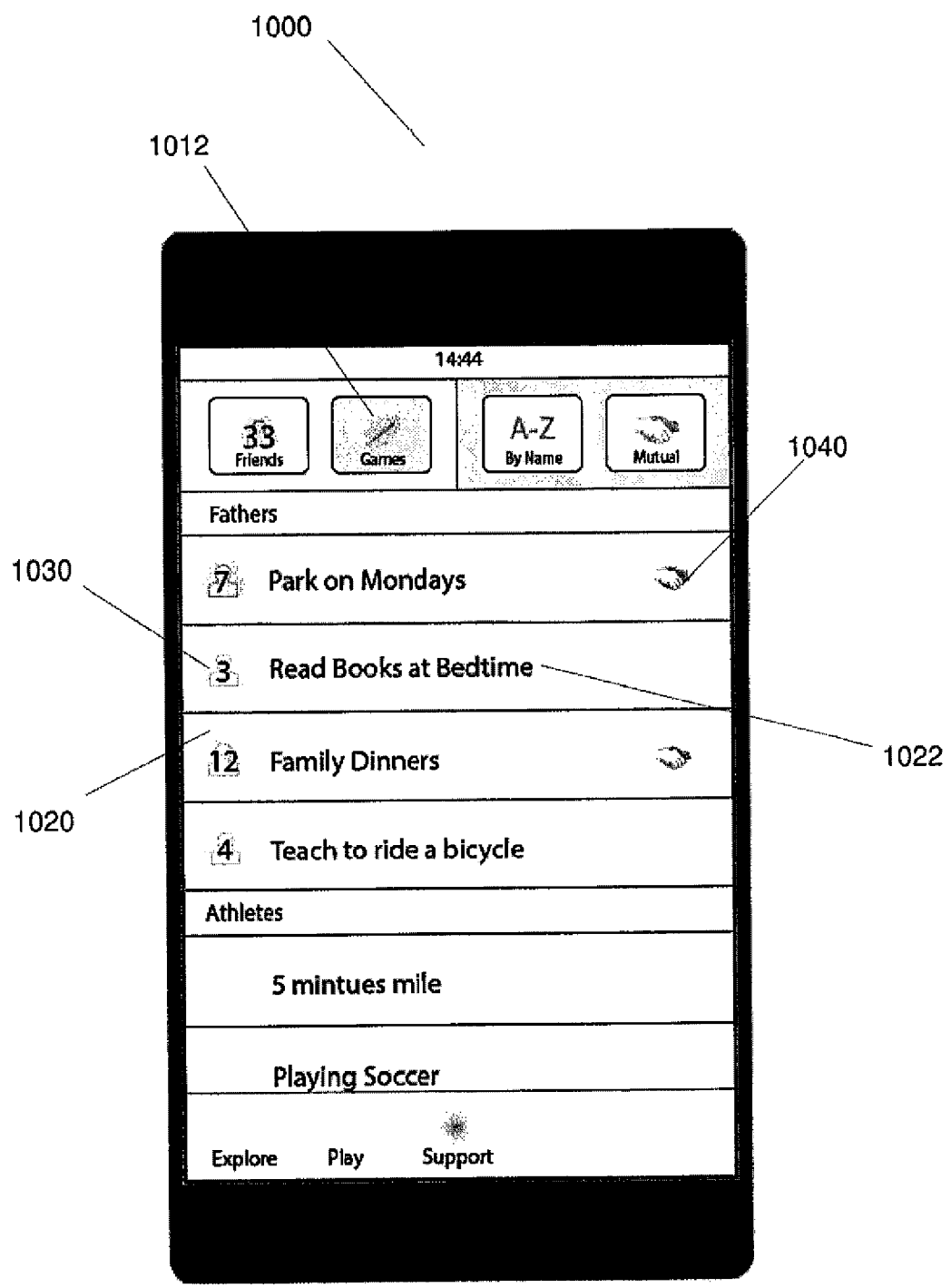
FIG. 10 shows a second example of a support screen of the game application by game, according to at least one embodiment of the invention.

FIG. 10 shows a second example of a support screen 1000 of the game application 100. This screen may be reached, for example, by activating the button 712 on the screen 700 that is also shown as highlighted button 1012 on screen 1000. In this example, each of the active games of the user's friends is displayed in the area 1020. Again, the games are listed by league and game, but may be listed in any other manner. Each of the games includes an icon 1030 showing the number of the user's friends that are actively playing the listed game. The screen 1000 also shows the handshake icon 1040 that indicates those games that the user is also actively playing. The user can select any of the games to identify the friends that are playing. For example, the user may select the game read books at bedtime 1022 that includes icon 1030 indicating there are three (3) friends playing.

Figure 11:
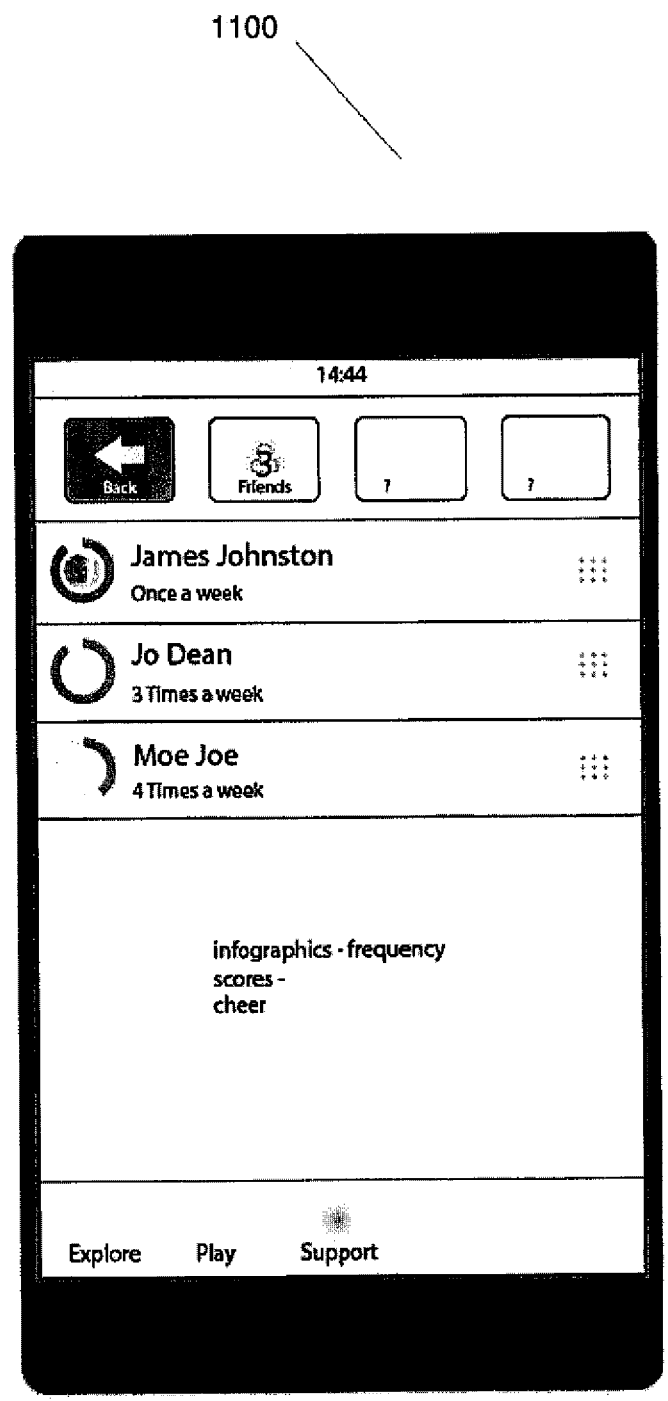
FIG. 11 shows an example of a friend's game screen of the game application, according to at least one embodiment of the invention.

The selection of this game leads the user to the display screen 1100 of FIG. 11. FIG. 11 shows an example of a friends game screen 1100 of the game application 100. The screen 1100 shows the three friends that are actively playing this game. By selecting one of the friends, this can lead to the screen 800 that shows additional details for the friend. Another button can allow the user to see the comparison of the user to all three friends in this game.

The support functionality 125 can also include the message functionality 155 that allows a user to send messages to other users or friends. This allows users to send encouragement to their friends and support them to reach their goals.

Figure 12:
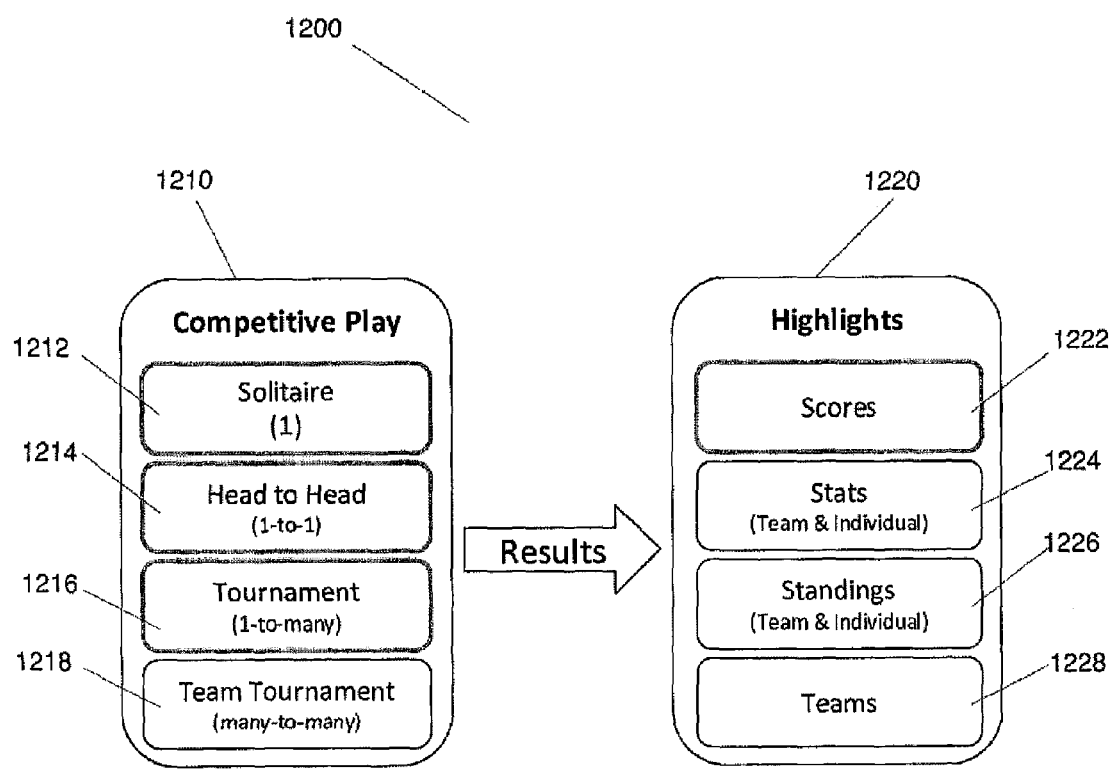
FIG. 12 shows an exemplary overview of competitive play and the score/highlight functionality of the game application, according to at least one embodiment of the invention.

The score functionality 160 can relate to competitive play. FIG. 12 shows an exemplary overview 1200 of competitive play 1210 and the score/highlight functionality 1220 of the game application. In accordance with various embodiments of the invention, each game can be played, for example, in Solitaire mode 1212 (1 player), in Head to Head mode 1214 (1 to 1), in Tournament mode 1216 (1 to many) and in a Team Tournament mode 1218 (many to many). Those skilled in the art will understand that each game can have its own features and therefore the exact type of play will vary from game to game. The various options for competitive play, as well as the grouping of users into teams, groups, etc., can be game parameters selected by the user(s) and/or by the server executing the game application 100 on behalf of the user(s), depending the type of game, the goal to be accomplished, information relating to the user(s) (e.g., information previously provided in user profiles), etc. As explained above, game parameters can be incorporated into a game framework to customize any given game on behalf of one or more users (participants).

In some embodiments, the score/highlight functionality 1220 allows the user to track their own results and the results of other players. In other embodiments, the score/highlight functionality 1220 tracks a user's results and the results of other players on behalf of the users. In the various embodiments, the results can include the scores 1222 for each player and/or team, the statistics 1224 for each player and/or team, the standings 1226 in the league for each player and/or team, and the teams 1228 that are in the league. One of the functionalities not described above is that users may band together to form a team in a particular game. The team may be formed in the same way as a challenge. For example, instead of sending a challenge, the user may send an invite to a friend or other user to join a team for the game. Likewise, teams can be suggested by the system itself based on similarity of goals, profiles, etc. The other user may accept or decline the invite to join the team. The team functionality 1228 may display the team name and the members of the team for each game and/or league.

Furthermore, a message and/or cheer provided to a user can include a computational score or other measure of the success regarding activity of the user, which can be applied to the profile of the user, team, etc., and/or incorporated in the tracking of the user's success within a given game, allowing one user to score for others. For example, a coaching functionality can enable a mother to keep score for her children, (e.g., giving out "points" if they did their homework and brushed their teeth), a therapist to score a patient, a teacher to score for students, etc. The rewards and sponsors functionality 165 may relate to specific goals and games. For example, the playing of the game may earn the user points. There may be multiple types of currencies. For example, system points may accrue and are used solely to make the user feel good about what has been accomplished. Sponsored points can be used earn sponsor rewards (e.g., earn 5 cents on Glad products or "800-flowers" every time you take out the garbage for your wife). Parents could put in currency (a.k.a. allowance for cleaning room). A job could put in currency for completing extra tasks. The user and/or the game application 100 can set rewards for users for accomplishing particular goals as additional game parameters for the game framework. In the Yankee ticket example described above, it is the user that will provide the reward to themselves. However, the rewards can also be based on points wherein sponsors of games provide a particular reward upon the earning of points. For example, if the user is participating in an exercise game, the user can be rewarded with a 20% off coupon to a sponsoring sporting goods store upon the earning of a predetermined number of points. By tying commercial sponsorship to the system, and the system providing details about existing and/or proposed games to potential sponsoring entities, users can be motivated to continue to improve and avoid the typical abandonment of aspirations.

It should be noted that the games may have different levels of privacy or user settable privacy settings. In one example, the game may be public, but the activities are private. In another example, both the game and activities are private. An example of a private game with private activities can be a game to train a child to stop wearing pull-ups at night. This is important to the player, but the player does not want to embarrass their child by having either the game or activity public. Those of ordinary skill in the art would understand further privacy capabilities.

Additional privacy setting can control how and which games are displayed to other users (e.g., friends only). In some embodiments, users only see games approved by the network for public viewing, as well as games that a user and/or the user's friends are playing. Furthermore, users can also see the total points earned across the network (beyond just the user's friends) to show the success of the game. As an example, any games relating to diets that a user's friends are on might appear in potential diets categories. At the same time, if across the network more users are succeeding with another diet that is not presently being used by the user or the user's friends, that diet game can be ranked the highest (i.e., currently most successful). Therefore, ranking can be controlled by the network, while a user's particular group of friends/contacts can control which games that user will see.

Figure 13:
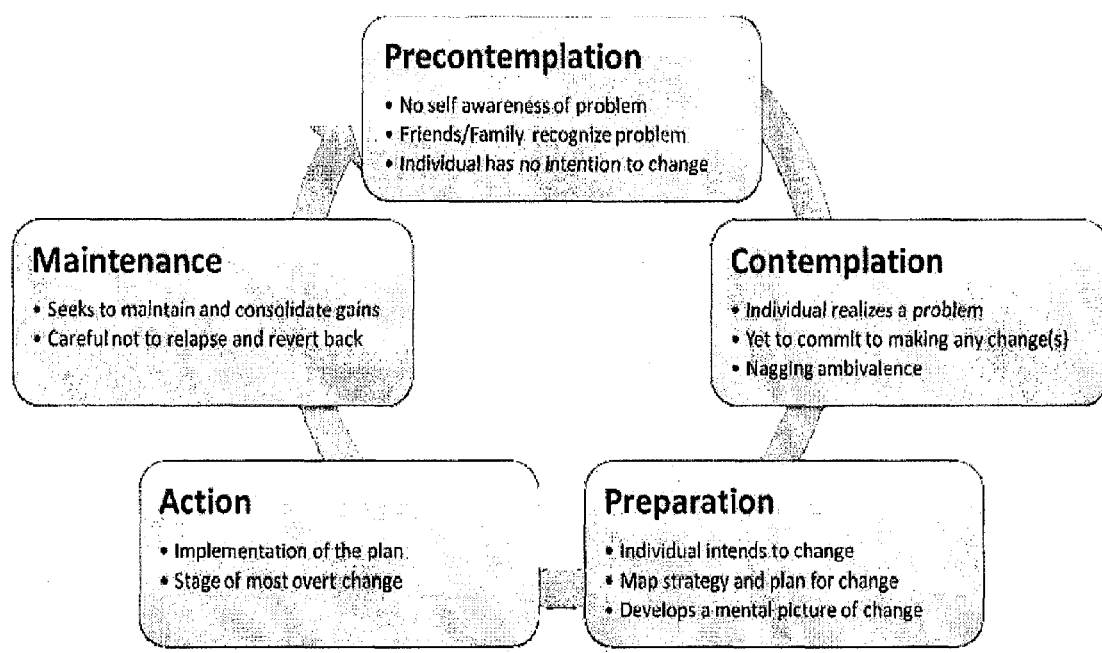
FIG. 13 shows the five stages of change that are supported by the game application, according to at least one embodiment of the invention.

FIG. 13 shows five representative stages of change that can be supported by the game application 100: (1) precontemplation, (2) contemplation, (3) preparation, (4) action, and (5) maintenance.

Figure 14:
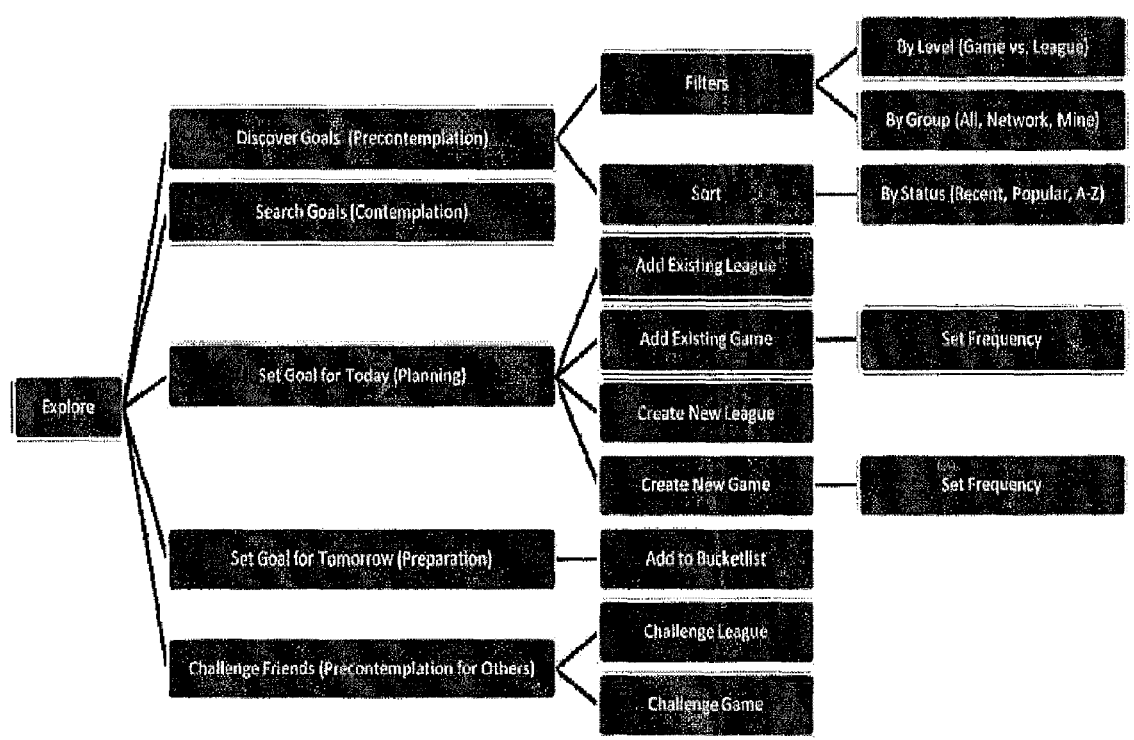
FIG. 14 shows a summary of the functional and technical capabilities of the explore functionality, according to at least one embodiment of the invention.

FIG. 14 shows a summary of the functional and technical capabilities of the explore functionality in accordance with embodiments of the invention.

FIG. 15 shows various examples of alpha test cases and test games that can be used to test the game application.

Figure 16:
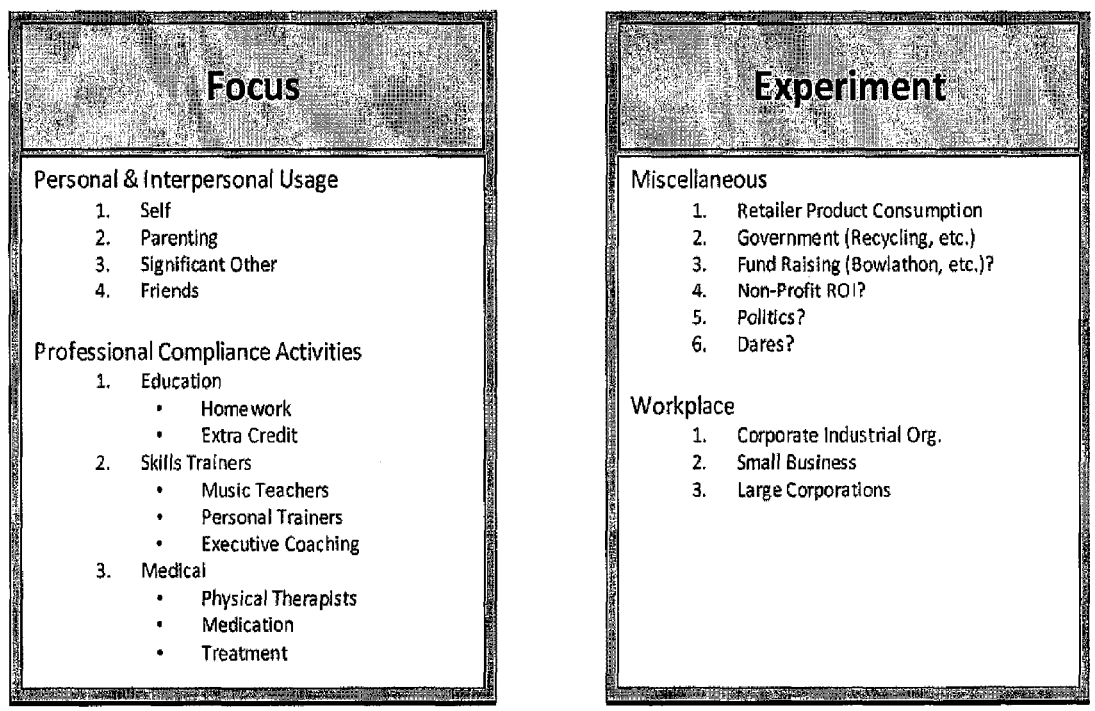
FIG. 16 shows examples of use case categories, according to at least one embodiment of the invention.

FIG. 16 shows examples of use case categories (e.g., focus, experiment, etc.).

Figure 17:
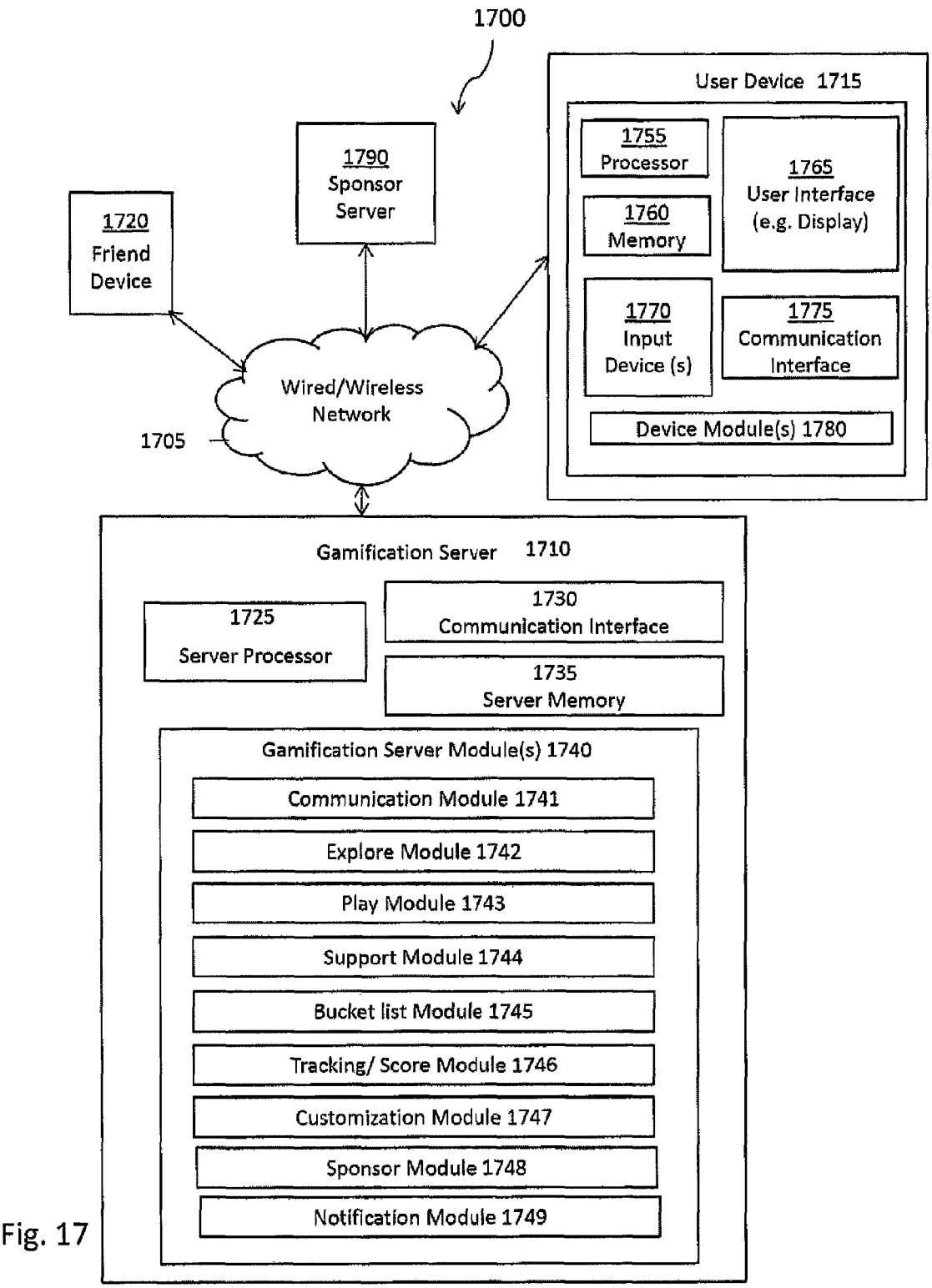
FIG. 17 shows a high-level diagram illustrating an exemplary configuration of a system in support of providing customized gamification, according to at least one embodiment of the invention.

FIG. 17 shows a high-level diagram illustrating an exemplary configuration of a system in support of providing customized gamification, according to at least one embodiment of the invention. The schematic block diagram illustrates a distributed network system 1700 including network 1705, which can comprise the Internet, one or more telephony networks, one or more network segments including local area networks (LAN) and wide area networks (WAN), one or more wireless networks, or a combination thereof. System 1700 also includes a gamification server 1710 constructed in accordance with one or more implementations of the invention. The gamification server 1710 communicates over network 1705 with multiple other processing machines such as computers, and more specifically stationary devices, mobile devices, and computer servers (collectively, "computing devices"). Communication with these computing devices can be either direct or indirect through further machines that are accessible to the network 1705.

The gamification server 1710 can be practically any computing device and/or data processing apparatus capable of communicating with computing devices, and other remote devices or computing networks, receiving, transmitting and storing electronic information and processing requests as further described herein. Gamification server 1710 is therefore intended to represent various forms of digital computers, such as laptops, desktops, workstations, personal digital assistants, servers, blade servers, mainframes, and other appropriate computers and/or networked or cloud based computing systems capable of employing the systems and methods described herein.

Among the computing devices on the network 1705 are user devices which can include user device 1715 and friend device 1720. As understood herein, in accordance with one or more embodiments, a computing device can be a stationary computing device, such as a desktop computer, kiosk and/or other machine, each of which generally is understood in the art as having one or more processors configured to execute code to implement a variety of functions, a computer-readable memory, one or more input devices, one or more output devices, and a communication port for connecting to the network 1705. Typical input devices can include a keyboard, pointing device (e.g., mouse or digitized stylus), a web-camera, and/or a touch-sensitive display, etc.

Additionally or alternatively, a computing device can be a mobile electronic device ("MED"), which is generally understood in the art as having hardware components as in the stationary device described above, and being capable of embodying the systems and/or methods described herein, but which may further include componentry such as wireless communications circuitry, gyroscopes, inertia detection circuits, geolocation circuitry, touch sensitivity, among other sensors. Non-limiting examples of typical MEDs are smartphones, personal digital assistants, tablet computers, and the like, which can communicate over cellular and/or Wi-Fi networks or using a Bluetooth or other communication protocol. Typical input devices associated with conventional MEDs include, keyboards, microphones, accelerometers, touch screens, light meters, digital cameras, and the input jacks that enable attachment of further devices, etc.

The gamification server 1710 can include a server processor 1725 which is operatively connected to various hardware and software components that serve to enable operation of the system 1700. Server processor 1725 serves to execute instructions to perform various operations relating to customized gamification as discussed above regarding game application 100, and as will be described in further detail below. Server processor 1725 can be a number of processors, a central processing unit CPU, a graphics processing unit GPU, a multi-processor core, or any other type of processor, depending on the particular implementation. Gamification server 1710 can be configured to communicate via communication interface 1730 with various other devices connected to network 1705. Preferably, communication interface 1730 can include but is not limited to, a modem, a Network Interface Card (NIC), an integrated network interface, a radio frequency transmitter/receiver (e.g., Bluetooth, cellular, NFC), a satellite communication transmitter/receiver, an infrared port, a USB connection, and/or any other such interfaces for connecting the gamification server 1710 to other computing devices and/or communication networks such as private networks and the Internet.

In certain implementations, a server memory 1735 is accessible by server processor 1725, thereby enabling server processor 1725 to receive and execute instructions stored on the memory and/or storage in the form of one or more server software modules represented by gamification server modules 1740. The gamification server modules 1740 can comprise one or more software programs or applications (collectively referred to as the "gamification server application") having computer program code or a set of instructions executed in the processor 1725 for carrying out operations for aspects of the systems and methods disclosed throughout this application, and can be written in any combination of one or more programming languages. As shown in FIG. 17, the exemplary software modules can include a communication module 1741, an explore module 1742, a play module 1743, a support module 1744, a bucket list module 1745, a track/score module 1746, a customization module 1747, a sponsor module 1748, and a notification module 1749. It should be noted that in accordance with various embodiments of the invention, gamification server modules 1740 can execute entirely on gamification server 1710 as a stand-alone software package, partly on gamification server 1710 and partly on the computing devices 1715 and/or 1720, or entirely on devices 1715 and/or 1720.

Server memory 1735 can be, for example, a random access memory (RAM) or any other suitable volatile or non-volatile computer readable storage medium. Server memory 1730 can also include storage which can take various forms, depending on the particular implementation. For example, the storage can contain one or more components or devices such as a hard drive, a flash memory, a rewritable optical disk, a rewritable magnetic tape, or some combination of the above. In addition, the memory and/or storage can be fixed or removable. In addition, memory and/or storage can be local to the gamification server 1710 or located remotely.

As shown in FIG. 17, a typical computing device, for example user device 1715, includes various hardware and software components that serve to enable operation of the system 1700, including one or more device processors 1755, a device memory 1760, a user interface 1765, one or more input devices 1770, a communication interface 1775, and one or more software modules 1780. As with server processor 1725, device processor 1755 can be a number of processors, a central processing unit CPU, a graphics processing unit GPU, a multi-processor core, or any other type of processor, depending on the particular implementation. Likewise, device memory 1760 is accessible by device processor 1755, thereby enabling the processor to receive and execute instructions encoded in the memory so as to cause the computing device and its various hardware components to carry out operations for aspects of the exemplary systems and methods disclosed herein. Device memory 1730 can comprise one or more of the memory configurations as described above with reference to server memory 1735.

A user interface 1765 is also operatively connected to device processor 1755. User interface 1765 can comprise a display and/or graphical inputs displayed thereon, which can serve to facilitate both the providing of information to a user and as an input device, depending on the particular hardware and software. Also connected to the device processor 1755 is one or more input and/or output device(s) 1770, such as switch(es), button(s), key(s), a touch-screen, microphone, etc., as would be understood in the art of electronic computing devices. Input devices 1770, which can be used in conjunction with user interface 1765 or on their own, serve to capture commands and/or actions from the user such as on-off commands, user-provided information, settings adjustments, and/or any relevant user interaction with the computing device related to operation of the system 1700.

Communication interface 1775 is also operatively connected to the device processor 1755 and can be any interface that enables communication between the computing device and external devices, machines and/or elements. As with the server communication interface 1730, the device communication interface 1775 can include but is not limited to, a modem, a Network Interface Card (NIC), an integrated network interface, a radio frequency transmitter/receiver (e.g., Bluetooth, cellular, NFC), a satellite communication transmitter/receiver, an infrared port, a USB connection, and/or any other such interfaces for connecting the computing device to communication interface 1730 of gamification server 1710 and/or other computing devices and/or communication networks such as private networks and the Internet. Such connections can include a wired connection or a wireless connection (e.g., using the 802.11 standard) though it should be understood that the communication interface can be practically any interface that enables communication to/from the computing device.

The one or more device modules 1780 are encoded in the memory 1760 of the computing device. The software modules can comprise one or more software programs or applications having computer program code or a set of instructions (collectively referred to as the "gamification device application") executed in device processor 1755. Such computer program code or instructions configure device processor 1755 to carry out operations of the systems and methods disclosed herein and can be written in any combination of one or more programming languages. It should be noted that in accordance with embodiments of the invention, device modules 1780 can execute entirely on computing devices 1715 and/or 1720 as a stand-alone software package, partly on the computing device and partly on gamification server 1710, or entirely on gamification server 1710. Furthermore, in FIG. 17 an additional computing device 1720 is designated as a "friend" device 1720. This designation is simply to convey that system 1700 can include a plurality of users and user devices in accordance with various embodiments of the invention, one or more of which can be operated by persons designated, within system 1700, as "friends" or contacts of the first user operating user device 1715.

It should also be noted that in accordance with various embodiments of the invention, either or both of gamification server modules 1740 and device modules 1780 can be understood to be representative of the game application 100 described in detail above. That is, the game application 100 described above can be implemented on gamification server1710 and/or user devices 1715, 1720, as described herein, with server modules enabling server functionality and device modules enabling device functionality as necessary.

System 1700 can also include a sponsor server 1790 constructed in accordance with one or more implementations of the invention as generally described above regarding gamification server 1710. The sponsor server 1790 communicates over network 1705 with multiple other processing machines including gamification server 1710 and user devices 1715, 1720. Communication with these computing devices can be either direct or indirect through further machines that are accessible to the network 1705.

Figure 18A:
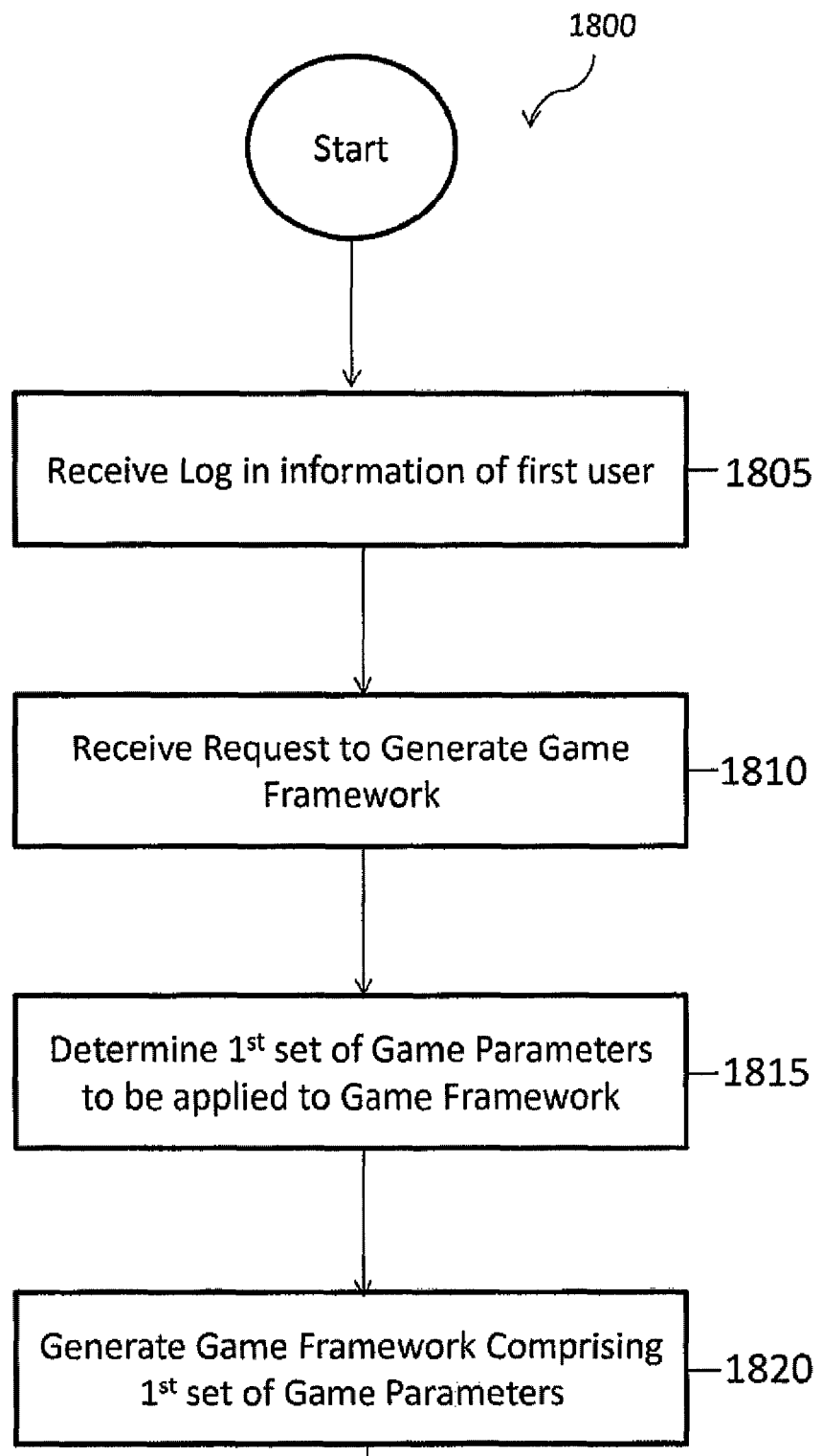
FIGS. 18A-B show a detailed flow diagram illustrating elements of a method in support of providing customized gamification for accomplishing goals, according to at least one embodiment of the invention.
Figure 18B:
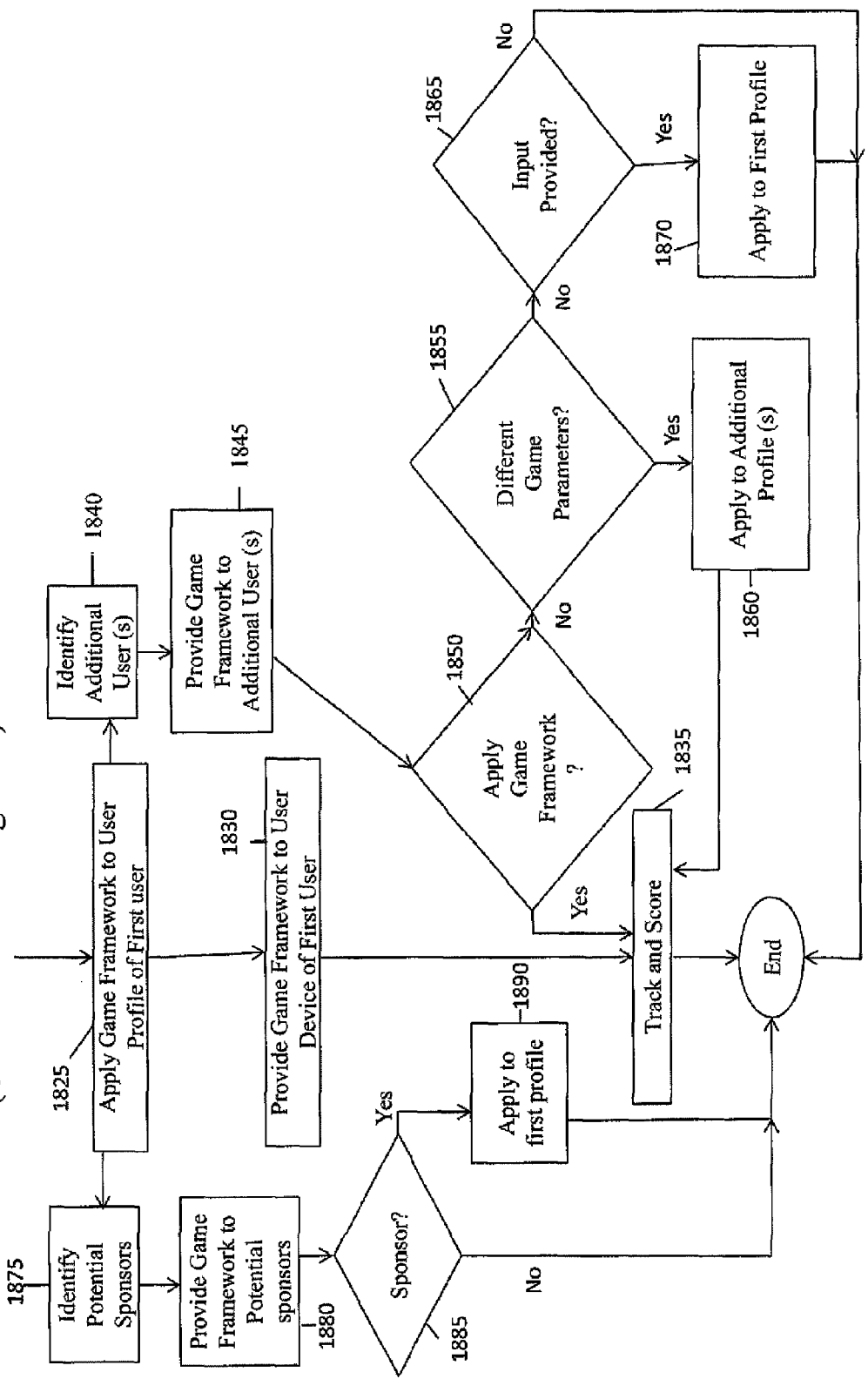

FIGS. 18A-B show a detailed flow diagram illustrating elements of a method in support of providing customized gamification for accomplishing goals, according to at least one embodiment of the invention.

Method 1800 starts at step 1805 when gamification server 1710, using server processor 1725, which is configured by executing one or more of gamification server modules 1740, including, preferably, communication module 1741, receives log-in information from the communication interface 1775 of user device 1715. Login information can include, for example, a user-defined password of a first user. Typically, an e-mail address or other user identification can be received in addition to the user-defined password in order to facilitate identifying the user, though this is may not be required, for example, when an IP address of the user device 1715 readily identifies the sender as the first user.

In accordance with embodiments of the invention, the user-defined password can be any alpha-numeric string, but optimally comprises a word, phrase, or character string that can be recalled by the sender during future interactions with system 1700. The user-defined password can be entered by the first user using one or more inputs of user device 1715, and received at gamification server 1710.

Once received, at step 1810, gamification processor 1725 can receive a request to generate a game framework from user device 1715. The request specifies a goal to be accomplished by one or more of a plurality of participants at least in part through interaction with the game framework, and typically, though not necessarily includes the sender of the request, i.e., the first user. As discussed in detail above, the systems and methods described herein can be used to generate games for one's self and/or for others. The request can be detailed (e.g., include specific details of the goal), or can be generic (e.g., simply indicate that a game framework is desired to aid in accomplishing a goal). A game framework as understood herein can refer to software providing at least some generic functionality which can be selectively changed/modified by additional input, thus providing application-specific game software.

At step 1815, server processor 1725 can execute computer memory code represented by play module 1743, to determine a first set of one or more game parameters to be applied to the game framework for at least a first participant, and possibly a plurality of participants as the case may be. As explained in detail above in relation to FIG. 4, a game parameter can be based on the type of goal to be accomplished, information in the user's profile, information provided by the user and/or a third party, information of multiple users, etc. A game parameter can be, for example, how often an activity should be performed (e.g., a number of times per day, week, month, etc.), what qualifies as performing an activity for a particular game, what percentage of an activity must be completed before the activity is considered complete, etc. It should be noted that in alternative embodiments, one or more game parameters can also be provided to gamification server 1710 directly by the user and/or by a third party, for example, via user devices 1715 and/or 1720.

Once the first set of parameters is determined, at step 1820, server processor 1725 can execute computer memory code represented by play module 1743, to generate the game framework comprising the first set of one or more game parameters. While technically at this point the game framework can also be considered a complete "game," i.e., a game application with a goal and at least one game parameter (e.g., a rule), it can still be considered a game framework, as the game parameters can be changed/modified/replaced by the various users of the game, as described above. Once the game framework has been generated, at step 1825, server processor 1725 can be configured to apply the game framework to a first profile relating to the first participant of the game, i.e., the first user. Furthermore, once the game framework has been created, it can be stored in memory of the server for other users to access, depending on the privacy settings associated with the game framework. Server processor 1725 can execute computer memory code represented by explore module 142, to provide the explore functionality discussed in detail above regarding FIGS. 1 and 14, so that other users can locate relevant games.

Next, at step 1830, server processor 1725 can execute computer memory code represented by communication module 1741, to provide the game framework to an electronic computing device of the first participant, e.g., user device 1715, over the network 1705. The first user can then interact with the game as described above, and at step 1835, the first user's interaction is tracked and/or scored when code executing in the processor 1725, and represented by tracking/score module 1746 configures the gamification server 1710 to do so track and/or generate a score for the user. It should again be noted that the first user's actual interaction with the game framework typically takes place on the user's mobile device, for example, by selecting buttons on user interface 1765 which correlated with various activities. Such interaction is communicated via communication interface 1775 of the user device 1715 to communication interface 1730 of gamification server 1710. Tracking and/or scoring can include, for example, tracking the first participant's interaction with the game framework on the electronic computing device while the participant attempts to accomplish the goal; computing, a first score for the first participant based at least in part on the tracking step and the first set of one or more game parameters; and updating the first profile with the first score. Of course, as the user continues to interact with the game framework, the score can be adjusted by the system as necessary.

At step 1840, in accordance with further embodiments of the invention, server processor 1725 can execute computer memory code represented by explore module 1742, to identify one or more additional users to which the generated game framework can be provided. To do so, the server processor 1725 can be configured to identify one or more additional participants to whom a challenge notification can be provided, to challenge the additional participants to the game framework, and provide each with a challenge notification by executing notification module 1749, giving each recipient an opportunity to decline the challenge. In accordance with embodiments of the invention, identifying additional participants can be enabled by the system accessing a database comprising at least the profile of the first user and profiles of additional participants, each profile including at least information about a goal to be accomplished by each participant, and identifying, based on the profiles, any additional participants whose profile indicates a similar goal to that of the first participant.

Once the server processor 1725 receives a challenge acceptance notification from the user device of one or more additional participants indicating acceptance of the challenge, at step 1845 the server processor 1725 can be configured to provide the game framework to the electronic computing device of the various participants who have accepted the challenge, e.g., friend device 1720. Alternatively, the system 1700 can be configured to proactively provide the game framework, rather than providing an initial challenge notification, such as, for example, in situations when participation in a game challenge is required. At step 1850, once additional participants have received the game framework on their respective user devices, the server processor 1725 can execute computer memory code represented by customization module 1747, to determine whether to apply the same game framework (which comprises the first game parameters) to the profiles of the additional participants. As explained above, such a determination can be made by comparing profiles and/or other previously provided information of various users to determine whether the first game parameters are appropriate. If the first game parameters are appropriate, then the game framework can be applied as is, and the system can then track and/or score the games of the additional participants as well.

If a determination is made by the system not to provide the same game framework (i.e., the first game parameters are deemed to be inappropriate), then at step 1855, the server processor 1725 can be configured to determine additional/alternative sets of parameters to be applied to the profiles of the additional participants for the received game framework, for example, as in step 1815. Furthermore, the system can be configured to receive, for example, via friend device 1720, a user-defined additional/alternate set of game parameters. Once the additional participants approve the additional/alternate set of game parameters, at step 18 60 the additional/alternate set of game parameters can be applied to the respective profiles of the friends (users) who provided them.

At step 1865, even when no game frameworks or parameters have been applied to a friend's profile (e.g., the friend rejects the challenge), the server processor 1725 can execute computer memory code represented by support module 1744, to receive one or more inputs from the friend device 1720 of the second participant (e.g., a "cheer" for a user). In accordance with a first embodiment of the invention, an input can comprise a message to be provided to user device 1715 of the first participant. For example, the message can be words of support and motivation, such as "keep it up" or "you're doing great," etc., or can be words of advice. In other embodiments, the input can comprise information concerning the first participant's attempt to accomplish the goal, such as a log of events or other observation. Alternatively/additionally, the input can include a scoring computation relating to the first participant. For example, a "coach" can provide a score to the first user, etc. for reaching particular milestones.

In each of these embodiments, at step 1870 the input can be applied to the profile of the first user. If the friend does not provide any input, the method ends, unless the friend decides to save the game framework for possible future use. In this case, the server processor 1725 can execute computer memory code represented by bucket list module 1745, to store the game framework and/or any relevant details about the game framework (e.g., by whom is was shared, the specific game parameters, etc.) in a database of gamification server 1710 and/or in memory of the friend user device 1720.

It should be noted that a user and/or friend does not have to first receive a challenge notification in order to provide an input. For instance, a friend desiring to participate in a user's attempt to achieve his or her goal by providing words of encouragement or advice to the user, the friend can provide an input (presuming privacy settings allow for the input to be provided to the user), without the friend having to first commit to using the system to achieve a goal.

As with identifying additional participants, at step 1875, the server processor 1725 can execute computer memory code represented by sponsor module 1748, to identify potential sponsors to whom a sponsorship request can be provided. In accordance with some embodiments of the invention, a sponsorship can comprise any incentives offered by a sponsor to participants of the system 1700 to further encourage those participants to accomplish their desired goals. Therefore, a sponsorship request can be generated and sent, by executing notification module 1749, to a server of a potential sponsor, such as, for example, sponsor server 1790, over the network based on the identifying step. A sponsorship request can comprise, for example, the goal to be accomplished by the participants of the game framework, and/or the first set of game parameters. Additionally/alternatively, in some embodiments, information relating to the participants can also be provided, depending on the privacy settings of each participant.

At step 1880, in lieu of or in addition to the information above, the game framework itself can be provided to potential sponsors. If, at step 1885, the gamification server 1710 receives a sponsorship offer notification from the sponsor server 1790, including, for example, a particular sponsorship relating to the goal to be accomplished by the one or more participants and/or the game parameters, then at step 1890 the sponsorship offer notification can be provided to the electronic computing device of each participant to which the offer applies, and/or apply the sponsorship offer notification to the respective profiles of the participants over the network. If no sponsorship offer notifications are received, the method ends.

At this juncture, it should be noted that although much of the foregoing description has been directed to systems and methods in support of providing customized gamification for accomplishing goals, the systems and methods disclosed herein can be similarly deployed and/or implemented in scenarios, situations, and settings far beyond the referenced scenarios. It is to be understood that like numerals in the drawings represent like elements through the several figures, and that not all components and/or steps described and illustrated with reference to the figures are required for all embodiments or arrangements.

Thus, illustrative embodiments and arrangements of the present systems and methods provide a computer implemented method, computer system, and computer program product in support of providing customized gamification. The flowchart and block diagrams in the figures illustrate the architecture, functionality, and operation of possible implementations of systems, methods and computer program products according to various embodiments and arrangements. In this regard, each block in the flowchart or block diagrams can represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The functions describe herein can be implemented by hardware and or hardware executing code (also known as programs, software, or software applications) which include machine instructions for a programmable processor, and can be implemented in a high-level procedural and/or object-oriented programming language, and/or in assembly/machine language. As used herein, the terms machine-readable storage medium and computer-readable storage medium refer to any computer program product, apparatus and/or device (e.g., magnetic discs, optical disks, memory, Programmable Logic Devices (PLDs)) used to provide machine instructions and/or data to a programmable processor, including a machine-readable storage medium that receives machine instructions as a machine-readable signal. The term machine-readable signal refers to any signal used to provide machine instructions and/or data to a programmable processor. A machine-readable storage medium does not include a machine-readable signal.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method in support of providing customized gamification for accomplishing goals, performed by a server, the server being connected to a network and having a memory, a processor, and one or more code sets stored in the memory and executable in the processor, the method comprising:

receiving, at the processor, a request to generate a game framework, wherein the request specifies a goal to be accomplished by one or more of a plurality of participants at least in part through interaction with the game framework;

determining, using code executing in the processor, a first set of one or more game parameters to be applied to the game framework for at least a first participant of the plurality of participants;

generating, using code executing in the processor, the game framework comprising the first set of one or more game parameters;

applying, using code executing in the processor, the game framework comprising the first set of one or more game parameters to a first profile relating to the first participant of the plurality of participants;

providing, using code executing in the processor, the game framework to an electronic computing device of the first participant over the network;

classifying one or more game frameworks for accomplishing a particular goal as being part of a particular league framework;

storing the one or more classified game frameworks and the particular league framework in a database of the server;

enabling the electronic computing device of the first participant to access the database, wherein the first participant can browse the particular league framework and select one or more classified game frameworks to be provided to the electronic computing device of the first participant; and providing a selected one or more classified game frameworks to the electronic computing device of the first participant.

2. The method as in claim 1, further comprising:

tracking, using code executing in the processor, the first participant's interaction with the game framework on the electronic computing device while the participant attempts to accomplish the goal;

computing, using code executing in the processor, a first score for the first participant based at least in part on the tracking step and the first set of one or more game parameters; and updating, using code executing in the processor, the first profile with the first score.

3. The method as in claim 1, wherein the first set of one or more game parameters to be applied to the first profile is determined based at least in part on a set of previously provided user information relating to the first participant.

4. The method as in claim 1, further comprising:

providing, using code executing in the processor, the game framework to an electronic computing device of a second participant of the plurality of participants over the network;

determining, using code executing in the processor, whether to one of:

(i) apply the first set of one or more game parameters to a second profile relating to the second participant;

(ii) determine a second set of one or more game parameters to be applied to the second profile relating to the second participant; or (iii) apply a third set of one or more game parameters provided by the second participant; and applying, using code executing in the processor, a determined set of one or more game parameters to the second profile relating to the second participant of the plurality of participants.

5. The method as in claim 4, wherein the determined set of one or more game parameters to be applied to the second profile relating to the second participant is determined based at least in part on a set of previously provided user information relating to the second participant.

6. The method as in claim 1, further comprising:

providing, using code executing in the processor, the game framework to an electronic computing device of a second participant of the plurality of participants over the network;

receiving, at the processor, an input from the electronic computing device of the second participant, wherein the input comprises at least one of a message, information concerning the first participant's attempt to accomplish the goal, and a scoring computation relating to the first participant; and applying, using code executing in the processor, the at least one of the message, the information concerning the first participant's attempt to accomplish the goal, and the scoring computation to the first profile of the first participant of the plurality of participants.

7. The method as in claim 1, further comprising:

identifying, using code executing in the processor, one or more additional participants from the plurality of participants to whom a challenge notification can be provided to challenge the one or more additional participants to the game framework;

providing, by code executing in the processor, the challenge notification to an electronic computing device of the one or more additional participants;

receiving, at the processor, a challenge acceptance notification from the electronic computing device of the one or more additional participants indicating acceptance of the challenge; and providing, using code executing in the processor, the game framework to the electronic computing device of the one or more additional participants of the plurality of participants over the network.

8. The method as in claim 7, wherein the identifying step further comprises accessing a database comprising at least the first profile and profiles of the one or more additional participants, each profile including at least information about a goal to be accomplished by each participant; and identifying, based on the profiles, at least one of the one or more additional participants whose profile indicates a similar goal to that of the first participant.

9. The method as in claim 1, further comprising:

identifying, using code executing in the processor, at least one potential sponsor to whom a sponsorship request can be provided, wherein a sponsorship comprises one or more incentives offered by a sponsor to the one or more of the plurality of participants to further encourage the one or more of the plurality of participants to accomplish the goal;

providing, by code executing in the processor, the sponsorship request to a server of the at least one potential sponsor over the network based on the identifying step, wherein the sponsorship request comprises at least the goal to be accomplished by the one or more of the plurality of participants and the first set of one or more game parameters;

receiving, at the processor, a sponsorship offer notification from the server of the at least one potential sponsor, wherein the sponsorship offer notification comprises a particular sponsorship relating to the goal to be accomplished by the one or more of the plurality of participants and the first set of one or more game parameters; and providing, using code executing in the processor, the sponsorship offer notification to the electronic computing device of the one or more of the plurality of participants over the network.

10. A system in support of providing customized gamification for accomplishing goals, comprising:
a server having a processor and memory, and being connected to a network;
a plurality of code sets that are executable in the processor and which, when executed, configure the processor to:
receive a request to generate a game framework, wherein the request specifies a goal to be accomplished by one or more of a plurality of participants at least in part through interaction with the game framework;
determine a first set of one or more game parameters to be applied to the game framework for at least a first participant of the plurality of participants;
generate the game framework comprising the first set of one or more game parameters;
apply the game framework comprising the first set of one or more game parameters to a first profile relating to the first participant of the plurality of participants;
provide the game framework to an electronic computing device of the first participant over the network;
classify one or more game frameworks for accomplishing a particular goal as being part of a particular league framework;
store the one or more classified game frameworks and the particular league framework in a database of the server;
enable the electronic computing device of the first participant to access the database, wherein the first participant can browse the particular league framework and select one or more classified game frameworks to be provided to the electronic computing device of the first participant; and
provide a selected one or more classified game frameworks to the electronic computing device of the first participant.

11. The system as in claim 1, further configured to:
track the first participant's interaction with the game framework on the electronic computing device while the participant attempts to accomplish the goal;
compute a first score for the first participant based at least in part on the tracking step and the first set of one or more game parameters; and
update the first profile with the first score.

12. The system as in claim 1, wherein the first set of one or more game parameters to be applied to the first profile is determined based at least in part on a set of previously provided user information relating to the first participant.

13. The system as in claim 1, further configured to:
provide the game framework to an electronic computing device of a second participant of the plurality of participants over the network; determine whether to one of:
(i) apply the first set of one or more game parameters to a second profile relating to the second participant;
(ii) determine a second set of one or more game parameters to be applied to the second profile relating to the second participant; or
(iii) apply a third set of one or more game parameters provided by the second participant; and
apply a determined set of one or more game parameters to the second profile relating to the second participant of the plurality of participants.

14. The system as in claim 4, wherein the determined set of one or more game parameters to be applied to the second profile relating to the second participant is determined based at least in part on a set of previously provided user information relating to the second participant.

15. The system as in claim 1, further configured to:
provide the game framework to an electronic computing device of a second participant of the plurality of participants over the network;
receive an input from the electronic computing device of the second participant, wherein the input comprises at least one of a message, information concerning the first participant's attempt to accomplish the goal, and a scoring computation relating to the first participant; and
apply the at least one of the message, the information concerning the first participant's attempt to accomplish the goal, and the scoring computation to the first profile of the first participant of the plurality of participants.

16. The system as in claim 1, further configured to:
identify one or more additional participants from the plurality of participants to whom a challenge notification can be provided to challenge the one or more additional participants to the game framework;
provide the challenge notification to an electronic computing device of the one or more additional participants;
receive a challenge acceptance notification from the electronic computing device of the one or more additional participants indicating acceptance of the challenge; and
provide the game framework to the electronic computing device of the one or more additional participants of the plurality of participants over the network.

17. The system as in claim 7, further configured to:
access a database comprising at least the first profile and profiles of the one or more additional participants, each profile including at least information about a goal to be accomplished by each participant; and
identify, based on the profiles, at least one of the one or more additional participants whose profile indicates a similar goal to that of the first participant.

18. The system as in claim 1, further configured to:
identify, using code executing in the processor, at least one potential sponsor to whom a sponsorship request can be provided, wherein a sponsorship comprises one or more incentives offered by a sponsor to the one or more of the plurality of participants to further encourage the one or more of the plurality of participants to accomplish the goal;
provide the sponsorship request to a server of the at least one potential sponsor over the network based on the identifying step, wherein the sponsorship request comprises at least the goal to be accomplished by the one or more of the plurality of participants and the first set of one or more game parameters;
receive a sponsorship offer notification from the server of the at least one potential sponsor, wherein the sponsorship offer notification comprises a particular sponsorship relating to the goal to be accomplished by the one or more of the plurality of participants and the first set of one or more game parameters; and provide the sponsorship offer notification to the electronic computing device of the one or more of the plurality of participants over the network.

19. A method in support of providing customized gamification for accomplishing goals, performed by a server, the server being connected to a network and having a memory, a processor, and one or more code sets stored in the memory and executable in the processor, the method comprising:

receiving, at the processor, a request to generate a game framework, wherein the request specifies a goal to be accomplished by one or more of a plurality of participants at least in part through interaction with the game framework;

determining, using code executing in the processor, a first set of one or more game parameters to be applied to the game framework for at least a first participant of the plurality of participants;

generating, using code executing in the processor, the game framework comprising the first set of one or more game parameters; applying, using code executing in the processor, the game framework comprising the first set of one or more game parameters to a first profile relating to the first participant of the plurality of participants;

providing, using code executing in the processor, the game framework to an electronic computing device of the first participant over the network;

identifying, using code executing in the processor, at least one potential sponsor to whom a sponsorship request can be provided, wherein a sponsorship comprises one or more incentives offered by a sponsor to the one or more of the plurality of participants to further encourage the one or more of the plurality of participants to accomplish the goal;

providing, by code executing in the processor, the sponsorship request to a server of the at least one potential sponsor over the network based on the identifying step, wherein the sponsorship request comprises at least the goal to be accomplished by the one or more of the plurality of participants and the first set of one or more game parameters;

receiving, at the processor, a sponsorship offer notification from the server of the at least one potential sponsor, wherein the sponsorship offer notification comprises a particular sponsorship relating to the goal to be accomplished by the one or more of the plurality of participants and the first set of one or more game parameters; and providing, using code executing in the processor, the sponsorship offer notification to the electronic computing device of the one or more of the plurality of participants over the network.

* * * * *